United States Patent

Hamamura et al.

[11] Patent Number: 5,952,804
[45] Date of Patent: Sep. 14, 1999

[54] SERVO CONTROL METHOD AND SERVO CONTROL SYSTEM FOR FEED DRIVE SYSTEM

[75] Inventors: Minoru Hamamura; Sadaji Hayama; Jun Fujita; Takao Date; Kazuo Nagashima, all of Shizuoka-ken, Japan

[73] Assignee: Toshiba Kikai Kabushiki Kaisha, Tokyo, Japan

[21] Appl. No.: 09/170,115

[22] Filed: Oct. 13, 1998

[30] Foreign Application Priority Data

Oct. 14, 1997 [JP] Japan .................................. P9-280885
Aug. 21, 1998 [JP] Japan .................................. P10-235870

[51] Int. Cl.$^6$ .......................... G05B 13/00; G05B 19/19; G05D 3/12; G11B 5/596

[52] U.S. Cl. .......................... 318/560; 318/632; 318/561; 318/618; 318/610

[58] Field of Search ............................ 318/116, 560–696; 360/77.08, 77.04; 310/316, 317; 364/150, 149, 162, 158, 157, 165

[56] References Cited

U.S. PATENT DOCUMENTS

| | | | |
|---|---|---|---|
| 4,990,840 | 2/1991 | Migda | 318/571 |
| 5,107,193 | 4/1992 | Iwashita | 318/560 |
| 5,223,778 | 6/1993 | Svarovsky et al. | 318/610 |
| 5,418,440 | 5/1995 | Sakaguchi et al. | 318/560 |
| 5,532,565 | 7/1996 | Vervoordeldonk | 318/610 |
| 5,550,685 | 8/1996 | Drouin | 360/77.08 |
| 5,589,748 | 12/1996 | Kazama et al. | 318/560 |
| 5,736,822 | 4/1998 | Mitarai et al. | 318/116 |

Primary Examiner—Paul Ip
Attorney, Agent, or Firm—Finnegan, Henderson, Farabow, Garrett & Dunner, L.L.P.

[57] ABSTRACT

Letting a differential value of a command value of a position command to a position control loop be an input variable, a feed forward compensation value is calculated depending on the input variable and a combination of a proper vibration frequency and an attenuation constant of a vibration in a moving direction of a moving mechanism to be set in a parameter setting manner, and a feed forward compensation is effected for the command value of the position command to the position control loop by the feed forward compensation value.

42 Claims, 10 Drawing Sheets $Jb = Jm + Jn$

SERVO CONTROL METHOD AND SERVO CONTROL SYSTEM FOR FEED DRIVE SYSTEM

BACKGROUND OF THE INVENTION

1. Field of the Invention

The present invention relates to a servo control method and a servo control system for a feed drive system, and particularly, to a servo control method and a servo control system for a feed drive system of a machine tool for a high speed, high precision processing.

2. Description of Relevant Art

The machine tool includes a feed drive system and a servo control system for the feed drive system. The servo control system has three control loops for feedback control, i.e. a position loop as a major loop and speed and current loops as minor loops.

For feedback control of position, there are known a semi-closed loop system, a full-closed loop system and a hybrid control system. The semi-closed loop system employs a rotation angle signal of a servo motor, as a position feedback signal. The full-closed loop system employs a signal of a position scale for detecting an actual position of the machine, as a position feedback signal. The hybrid control system is a hybrid of the semi-closed loop system and the full-closed loop system.

The full-closed loop system carries all errors of the feed drive system (a mechanical system) in the control loop, allowing for a high precision to be expected. However, as the control loop contains many non-linear factors, the system tends to be unstable and has a sacrificed responsiveness for a stable action.

To this point, the semi-closed loop system does not directly take in complicated mechanical system performances, and is allowed to have an increased response speed with a secured stableness. However, as all errors of the feed drive system (a mechanical system) are not carried in the control loop, those errors left outside the loop are not covered for compensation. Like condition appears in the hybrid control system, which also has an error involved in a feeding movement.

Machine tools for a high speed, high precision processing employ servo control systems for their feed drive systems. Typically, most of those servo control systems are constituted as a semi-closed loop system or a hybrid control system, which however are disabled to compensate for an involved error in a feeding movement of a mechanical system, and subjected to a limitation on a potential desire for an enhanced processing route accuracy (configuration accuracy).

Such the limitation tends to be greater in significancy, as a feed speed is modified higher, with an increasing desire for a servo control system of a semi-closed loop system or a hybrid control system to be capable of a compensation for an involved error of a mechanical system, along with an increasing demand for a higher speed in mechanical processing, as well as for a higher precision.

Mechanical systems tend to have an involved error greater in significancy, as an employed feed speed is higher.

SUMMARY OF THE INVENTION

The present inventors have performed various simulations, searching for a mechanism of this tendency, arriving at a conclusion such that an elastic deformation due to an inertial force of a feed drive system increases with an increased feed speed as well as with an increased acceleration or deceleration speed, and an involved error of a mechanical system derives from the elastic deformation with a high probability.

The present invention has been achieved with this conclusion in view.

It therefore is an object of the present invention to provide a method and a system for an improved servo control for a feed drive system, permitting a compensation for as well as a correction of an involved error of a mechanical system that derives from an elastic deformation of the feed drive system due to an inertial force acting thereon.

To achieve the object, a first aspect of the invention provides a servo control method for a feed drive system including a moving mechanism controlled with a position control loop, the servo control method comprising the steps of having a differential value of a first command value of a position command to the position control loop, as a first input variable, calculating a first feed forward compensation value depending on the first input variable and a combination of a proper vibration frequency and an attenuation constant of a vibration in a moving direction of the moving mechanism to be set in a first parameter setting manner, and effecting a feed forward compensation for the first command value of the position command to the position control loop by the first feed forward compensation value.

According to this aspect of the invention, letting a differential value of a first command value of a position command to a position control loop be a first input variable, a first feed forward compensation value is calculated depending on the first input variable and a combination of a proper vibration frequency and an attenuation constant of a vibration in a moving direction of a moving mechanism to be set in a first parameter setting manner, and a feed forward compensation is effected for the first command value of the position command to the position control loop by the first feed forward compensation value.

According to a second aspect of the invention, the servo control method further comprises the steps of having a second order differential value of the first command value of the position command to the position control loop, as another input variable, calculating another feed forward compensation value depending on the another input variable and the proper vibration frequency of the vibration in the moving direction of the moving mechanism to be set in the first parameter setting manner, and effecting a feed forward compensation for the first command value of the position command to the position control loop by the another feed forward compensation value.

According to this aspect of the invention, letting a second order differential value of the first command value of the position command to the position control loop be another input variable, another feed forward compensation value is calculated depending on the another input variable and the proper vibration frequency of the vibration in the moving direction of the moving mechanism to be set in the first parameter setting manner, and a feed forward compensation is effected for the first command value of the position command to the position control loop by the another feed forward compensation value According to a third aspect of the invention, the moving mechanism includes a feed screw mechanism for converting a rotational motion of a servo motor into a linear movement, and the servo control method comprises the steps of having a differential value of a second command value of the position command to the position control loop, as a second input variable, calculating a second feed forward compensation value depending on the second input variable and a combination of a proper vibration frequency and an attenuation constant of a torsional vibration of the feed screw mechanism to be set in a second parameter setting manner, and effecting a feed forward compensation for the second command value of the position command to the position control loop by the second feed forward compensation value.

According to this aspect of the invention, as the moving mechanism includes a feed screw mechanism for converting a rotational motion of a servo motor into a linear movement, letting a differential value of a second command value of the position command to the position control loop be a second input variable, a second feed forward compensation value is calculated depending on the second input variable and a combination of a proper vibration frequency and an attenuation constant of a torsional vibration of the feed screw mechanism to be set in a second parameter setting manner, and a feed forward compensation is effected for the second command value of the position command to the position control loop by the second feed forward compensation value.

According to a fourth aspect of the invention, the moving mechanism includes a worm wheel mechanism for converting a rotational motion of a servo motor into a rotational movement, and the servo control method comprises the steps of having a differential value of a second command value of the position command to the position control loop, as a second input variable, calculating a second feed forward compensation value depending on the second input variable and a combination of a proper vibration frequency and an attenuation constant of a torsional vibration of the worm wheel mechanism to be set in a second parameter setting manner, and effecting a feed forward compensation for the second command value of the position command to the position control loop by the second feed forward compensation value.

According to this aspect of the invention, as the moving mechanism includes a worm wheel mechanism for converting a rotational motion of a servo motor into a rotational movement, letting a differential value of a second command value of the position command to the position control loop be a second input variable, a second feed forward compensation value is calculated depending on the second input variable and a combination of a proper vibration frequency and an attenuation constant of a torsional vibration of the worm wheel mechanism to be set in a second parameter setting manner, and a feed forward compensation is effected for the second command value of the position command to the position control loop by the second feed forward compensation value.

According to a fifth aspect of the invention, the servo control method further comprising the steps of having a second order differential value of the second command value of the position command to the position control loop, as another input variable, calculating another feed forward compensation value depending on the another input variable and the proper vibration frequency of the torsional vibration to be set in the second parameter setting manner, and effecting a feed forward compensation for the second command value of the position command to the position control loop by the another feed forward compensation value.

According to this aspect of the invention, letting a second order differential value of the second command value of the position command to the position control loop be another input variable, another feed forward compensation value is calculated depending on the another input variable and the proper vibration frequency of the torsional vibration to be set in the second parameter setting manner, and a feed forward compensation is effected for the second command value of the position command to the position control loop by the another feed forward compensation value.

A sixth aspect of the invention provides a servo control method for a feed drive system including a linear movement mechanism, the servo control method comprising the steps of calculating a correction value corresponding to a quantity of an elastic deformation in a linear movement direction of the linear movement mechanism depending on a combination of an inertial force and a rigidity in the linear movement direction of the linear movement mechanism, and correcting a command value of a position command by the correction value.

According to this aspect of the invention, a correction value corresponding to a quantity of an elastic deformation in a linear movement direction of a linear movement mechanism is calculated depending on a combination of an inertial force and a rigidity in the linear movement direction of the linear movement mechanism, and a command value of a position command is corrected by the correction value.

A seventh aspect of the invention provides a servo control method for a feed drive system including a linear movement mechanism, the servo control method comprising the steps of having an acceleration and a rigidity in a linear movement direction of the linear movement mechanism, as a combination of first input variables, calculating a first correction value corresponding to a quantity of an elastic deformation in the linear movement direction of the linear movement mechanism depending on the combination of first input variables and a mass of the linear movement mechanism to be set in a parameter setting manner, and correcting a command value of a position command by the first correction value.

According to this aspect of the invention, letting an acceleration and a rigidity in a linear movement direction of a linear movement mechanism be a combination of first input variables, a first correction value corresponding to a quantity of an elastic deformation in the linear movement direction of the linear movement mechanism is calculated depending on the combination of first input variables and a mass of the linear movement mechanism to be set in a parameter setting manner, and a command value of a position command is corrected by the first correction value.

According to an eighth aspect of the invention, the linear movement mechanism includes a feed screw mechanism for converting a rotational motion of a servo motor into a linear movement, and the servo control method comprises the steps of having an angular acceleration and a torsional rigidity of the linear movement mechanism, as a combination of second input variables, calculating a second correction value corresponding to a torsion angle of the feed screw mechanism depending on the combination of second input variables and a moment of inertia of the linear movement mechanism to be set in a parameter setting manner, and correcting a command value of the position command by the second correction value.

According to this aspect of the invention, as the linear movement mechanism includes a feed screw mechanism for converting a rotational motion of a servo motor into a linear movement, letting an angular acceleration and a torsional rigidity of the linear movement mechanism be a combination of second input variables, a second correction value corresponding to a torsion angle of the feed screw mechanism is calculated depending on the combination of second input variables and a moment of inertia of the linear movement mechanism to be set in a parameter setting manner, and a command value of the position command is corrected by the second correction value.

A ninth aspect of the invention provides a servo control method for a feed drive system including a linear movement mechanism, the servo control method comprising the steps of having a command value of a torque command to a servo motor and a rigidity in a linear movement direction of the linear movement mechanism, as a combination of first input variables, calculating a first correction value corresponding to a quantity of an elastic deformation in the linear movement direction of the linear movement mechanism depending on the combination of first input variables, and correcting a command value of a position command by the first correction value.

According to this aspect of the invention, letting a command value of a torque command to a servo motor and a rigidity in a linear movement direction of a linear movement mechanism be a combination of first input variables, a first correction value corresponding to a quantity of an elastic deformation in the linear movement direction of the linear movement mechanism is calculated depending on the combination of first input variables, and a command value of a position command is corrected by the first correction value.

According to a tenth aspect of the invention, the linear movement mechanism includes a feed screw mechanism for converting a rotational motion of the servo motor into a linear movement, and the servo control method comprises the steps of having a command value of the torque command to the servo motor and a torsional rigidity in the linear movement direction of the linear movement mechanism, as a combination of second input variables, calculating a second correction value corresponding to a torsion angle of the linear movement mechanism depending on the combination of second input variables, and correcting a command value of the position command by the second correction value.

According to this aspect of the invention, as the linear movement mechanism includes a feed screw mechanism for converting a rotational motion of the servo motor into a linear movement, letting a command value of the torque command to the servo motor and a torsional rigidity in the linear movement direction of the linear movement mechanism be a combination of second input variables, a second correction value corresponding to a torsion angle of the linear movement mechanism is calculated depending on the combination of second input variables, and a command value of the position command is corrected by the second correction value.

An eleventh aspect of the invention provides a servo control method for a feed drive system including a linear movement mechanism having a pair of linear movement axes perpendicular to each other and controlled with a position control loop for a feed drive to be effected with an arcuate interpolation, the servo control method comprising the steps of measuring a magnitude of maximum inertial torque acting about either linear movement axis, calculating a correction value corresponding to an elastic deformation in a linear movement direction of the linear movement mechanism at a respective coordinate position on a basis of the magnitude of maximum inertial torque, and correcting a command value of a position control loop by the correction value.

According to this aspect of the invention, a magnitude of maximum inertial torque acting about either linear movement axis is measured, a correction value corresponding to an elastic deformation in a linear movement direction of a linear movement mechanism at a respective coordinate position is calculated on a basis of the magnitude of maximum inertial torque, and a command value of a position control loop is corrected by the correction value.

According to a twelfth aspect of the invention, the measuring step comprises detecting a first magnitude of torque about the either axis, as the other axis has a zero speed, detecting a second magnitude of torque about the either axis, as this axis has a zero speed, and determining a difference between the first and second magnitudes of torque to be the magnitude of maximum inertial torque.

According to this aspect of the invention, in the measuring step a first magnitude of torque about the either axis is detected, as the other axis has a zero speed, a second magnitude of torque about the either axis is detected, as this axis has a zero speed, and a difference between the first and second magnitudes of torque is determined to be the magnitude of maximum inertial torque.

A thirteenth aspect of the invention provides a servo control method for a feed drive system including a linear movement mechanism, the servo control method comprising the steps of performing one of a computation and a measurement of a movement position of a moving body of the linear movement mechanism including an elastic deformation due to an inertial force, calculating a correction value in accordance with a difference between a command value of a position command and one of a computed value and a measured value of the movement position, and correcting the command value of the position command by the correction value.

According to this aspect of the invention, a movement position of a moving body of a linear movement mechanism is computed or measured including an elastic deformation due to an inertial force, a correction value is calculated in accordance with a difference between a command value of a position command and one of a computed value and a measured value of the movement position, and the command value of the position command is corrected by the correction value.

Further, to achieve the object described, a fourteenth aspect of the invention provides a servo control system for a feed drive system including a moving mechanism, the servo control system comprising a position control loop for a position control of the moving mechanism, and a first pre-compensator for having a differential value of a first command value of a position command to the position control loop, as a first input variable, calculating a first feed forward compensation value depending on the first input variable and a combination of a proper vibration frequency and an attenuation constant of a vibration in a moving direction of the moving mechanism to be set in a first parameter setting manner, and effecting a feed forward compensation for the first command value of the position command to the position control loop by the first feed forward compensation value.

According to this aspect of the invention, a servo control system comprises a position control loop for a position control of a moving mechanism, and a first pre-compensator. This first pre-compensator is adapted to have a differential value of a first command value of a position command to the position control loop, as a first input variable, calculate a first feed forward compensation value depending on the first input variable and a combination of a proper vibration frequency and an attenuation constant of a vibration in a moving direction of the moving mechanism to be set in a first parameter setting manner, and effect a feed forward compensation for the first command value of the position command to the position control loop by the first feed forward compensation value.

According to a fifteenth aspect of the invention, the first pre-compensator is adapted for having a second order differential value of the first command value of the position command to the position control loop, as another input variable, calculating another feed forward compensation value depending on the another input variable and the proper vibration frequency of the vibration in the moving direction of the moving mechanism to be set in the first parameter setting manner, and effecting a feed forward compensation for the first command value of the position command to the position control loop by the another feed forward compensation value.

According to this aspect of the invention, the first pre-compensator is further adapted to have a second order differential value of the first command value of the position command to the position control loop, as another input variable, calculate another feed forward compensation value depending on the another input variable and the proper vibration frequency of the vibration in the moving direction of the moving mechanism to be set in the first parameter setting manner, and effect a feed forward compensation for the first command value of the position command to the position control loop by the another feed forward compensation value.

According to a sixteenth aspect of the invention, the moving mechanism includes a feed screw mechanism for converting a rotational motion of a servo motor into a linear movement, and the servo control system comprises a second pre-compensator for having a differential value of a second command value of the position command to the position control loop, as a second input variable, calculating a second feed forward compensation value depending on the second input variable and a combination of a proper vibration frequency and an attenuation constant of a torsional vibration of the feed screw mechanism to be set in a second parameter setting manner, and effecting a feed forward compensation for the second command value of the position command to the position control loop by the second feed forward compensation value.

According to this aspect of the invention, as the moving mechanism includes a feed screw mechanism for converting a rotational motion of a servo motor into a linear movement, the servo control system further comprises a second pre-compensator. This second pre-compensator is adapted to have a differential value of a second command value of the position command to the position control loop, as a second input variable, calculate a second feed forward compensation value depending on the second input variable and a combination of a proper vibration frequency and an attenuation constant of a torsional vibration of the feed screw mechanism to be set in a second parameter setting manner, and effect a feed forward compensation for the second command value of the position command to the position control loop by the second feed forward compensation value.

According to a seventeenth aspect of the invention, the moving mechanism includes a worm wheel mechanism for converting a rotational motion of a servo motor into a rotational movement, and the servo control system comprises a second pre-compensator for having a differential value of a second command value of the position command to the position control loop, as a second input variable, calculating a second feed forward compensation value depending on the second input variable and a combination of a proper vibration frequency and an attenuation constant of a torsional vibration of the worm wheel mechanism to be set in a second parameter setting manner, and effecting a feed forward compensation for the second command value of the position command to the position control loop by the second feed forward compensation value.

According to this aspect of the invention, as the moving mechanism includes a worm wheel mechanism for converting a rotational motion of a servo motor into a rotational movement, the servo control system further comprises a second pre-compensator. This second pre-compensator is adapted to have a differential value of a second command value of the position command to the position control loop, as a second input variable, calculate a second feed forward compensation value depending on the second input variable and a combination of a proper vibration frequency and an attenuation constant of a torsional vibration of the worm wheel mechanism to be set in a second parameter setting manner, and effect a feed forward compensation for the second command value of the position command to the position control loop by the second feed forward compensation value.

According to an eighteenth aspect of the invention, the second pre-compensator is adapted for having a second order differential value of the second command value of the position command to the position control loop, as another input variable, calculating another feed forward compensation value depending on the another input variable and the proper vibration frequency of the torsional vibration to be set in the second parameter setting manner, and effecting a feed forward compensation for the second command value of the position command to the position control loop by the another feed forward compensation value.

According to this aspect of the invention, the second pre-compensator is further adapted to have a second order differential value of the second command value of the position command to the position control loop, as another input variable, calculate another feed forward compensation value depending on the another input variable and the proper vibration frequency of the torsional vibration to be set in the second parameter setting manner, and effect a feed forward compensation for the second command value of the position command to the position control loop by the another feed forward compensation value.

A nineteenth aspect of the invention provides a servo control system for a feed drive system including a linear movement mechanism, the servo control system comprising a controller for controlling a movement position of the linear movement mechanism with a position command, and a first corrector for having an acceleration and a rigidity in a linear movement direction of the linear movement mechanism, as a combination of first input variables, calculating a first correction value corresponding to a quantity of an elastic deformation in the linear movement direction of the linear movement mechanism depending on the combination of first input variables and a mass of the linear movement mechanism to be set in a parameter setting manner, and correcting a command value of the position command by the first correction value.

According to this aspect of the invention, a servo control system comprises a controller for controlling a movement position of a linear movement mechanism with a position command, and a first corrector. This first corrector is adapted to have an acceleration and a rigidity in a linear movement direction of the linear movement mechanism, as a combination of first input variables, calculate a first correction value corresponding to a quantity of an elastic deformation in the linear movement direction of the linear movement mechanism depending on the combination of first input variables and a mass of the linear movement mechanism to be set in a parameter setting manner, and correct a command value of the position command by the first correction value.

According to a twentieth aspect of the invention, the linear movement mechanism includes a feed screw mechanism for converting a rotational motion of a servo motor into a linear movement, and the servo control system comprises a second corrector for having an angular acceleration and a torsional rigidity of the linear movement mechanism, as a combination of second input variables, calculating a second correction value corresponding to a torsion angle of the feed screw mechanism depending on the combination of second input variables and a moment of inertia of the linear movement mechanism to be set in a parameter setting manner, and correcting a command value of the position command by the second correction value.

According to this aspect of the invention, as the linear movement mechanism includes a feed screw mechanism for converting a rotational motion of a servo motor into a linear movement, the servo control system further comprises a second corrector. This second corrector is adapted to have an angular acceleration and a torsional rigidity of the linear movement mechanism, as a combination of second input variables, calculate a second correction value corresponding to a torsion angle of the feed screw mechanism depending on the combination of second input variables and a moment of inertia of the linear movement mechanism to be set in a parameter setting manner, and correct a command value of the position command by the second correction value.

A twenty-first aspect of the invention provides a servo control system for a feed drive system including a linear movement mechanism, the servo control system comprising a controller for controlling a movement position of the linear movement mechanism with a position command and a magnitude of torque of an associated servo motor with a torque command, and a first corrector for having a command value of the torque command and a rigidity in a linear movement direction of the linear movement mechanism as a combination of first input variables, calculating a first correction value corresponding to a quantity of an elastic deformation in the linear movement direction of the linear movement mechanism depending on the combination of first input variables, and correcting a command value of the position command by the first correction value.

According to this aspect of the invention, a servo control system comprises a controller for controlling a movement position of a linear movement mechanism with a position command and a magnitude of torque of an associated servo motor with a torque command, and a first corrector. This first corrector is adapted to have a command value of the torque command and a rigidity in a linear movement direction of the linear movement mechanism, as a combination of first input variables, calculate a first correction value corresponding to a quantity of an elastic deformation in the linear movement direction of the linear movement mechanism depending on the combination of first input variables, and correct a command value of the position command by the first correction value.

According to a twenty-second aspect of the invention, the linear movement mechanism includes a feed screw mechanism for converting a rotational motion of the servo motor into a linear movement, and the servo control system comprises a second corrector for having the command value of the torque command and a torsional rigidity of the linear movement mechanism, as a combination of second input variables, calculating a second correction value corresponding to a torsion angle of the feed screw mechanism depending on the combination of second input variables, and correcting a command value of the position command by the second correction value.

According to this aspect of the invention, as the linear movement mechanism includes a feed screw mechanism for converting a rotational motion of the servo motor into a linear movement, the servo control system further comprises a second corrector. This second corrector is adapted to have the command value of the torque command and a torsional rigidity of the linear movement mechanism, as a combination of second input variables, calculate a second correction value corresponding to a torsion angle of the feed screw mechanism depending on the combination of second input variables, and correct a command value of the position command by the second correction value.

A twenty-third aspect of the invention provides a servo control system for a feed drive system including a linear movement mechanism having a pair of linear movement axes perpendicular to each other, the servo control system comprising a controller for controlling a feed position of the linear movement mechanism with a position command covering an arcuate interpolation, and a corrector for calculating a correction value corresponding to an elastic deformation in a linear movement direction of the linear movement mechanism at a respective coordinate position on a basis of a measured magnitude of maximum inertial torque acting about an associated linear movement axis, and correcting a command value of the position command by the correction value.

According to this aspect of the invention, a servo control system comprises a controller for controlling a feed position of a linear movement mechanism with a position command covering an arcuate interpolation, and a corrector. This corrector is adapted to calculate a correction value corresponding to an elastic deformation in a linear movement direction of the linear movement mechanism at a respective coordinate position on a basis of a measured magnitude of maximum inertial torque acting about an associated linear movement axis, and correct a command value of the position command by the correction value.

A twenty-fourth aspect of the invention provides a servo control system for a feed drive system including a linear movement mechanism, the servo control system comprising a controller for controlling a movement position of the linear movement mechanism with a position command, and a corrector for calculating a correction value in accordance with a difference between a command value of the position command and one of a computed value and a measured value of a moved position of a moving body of the linear movement mechanism including an elastic deformation due to an inertial force, and correcting the command value of the position command by the correction value.

According to this aspect of the invention, a servo control system comprises a controller for controlling a movement position of a linear movement mechanism with a position command, and a corrector. This corrector is adapted to calculate a correction value in accordance with a difference between a command value of the position command and one of a computed value and a measured value of a moved position of a moving body of the linear movement mechanism including an elastic deformation due to an inertial force, and correct the command value of the position command by the correction value.

Still further, to achieve the object described, a twenty-fifth aspect of the invention provides a method of controlling a servo system including a servo motor for driving a feed mechanism of a numerically controlled machine tool to provide a precise feed in accordance with a drive command supplied to the servo motor, the method comprising the steps of preparing an elastic mechanical model of an associated portion of the machine tool including the feed mechanism, sampling a data representative of a subsequent dynamic state of the feed mechanism, estimating a dynamic state of the elastic mechanical model on a basis of the sampled data, estimating a deformation of the elastic mechanical model under the estimated dynamic state, and controlling the drive command on a way of supply to the servo motor, to eliminate a probable error of the precise feed in the subsequent dynamic state of the feed mechanism, on a basis of the estimated deformation of the elastic mechanical model.

According to this aspect of the invention, an elastic mechanical model of a portion of a numerically controlled machine tool, associated with a feed mechanism of the machine tool, including the feed mechanism, is prepared, a data representative of a subsequent dynamic state of the feed mechanism is sampled, a dynamic state of the elastic mechanical model is estimated on a basis of the sampled data, a deformation of the elastic mechanical model under the estimated dynamic state is estimated, and a drive command is controlled on a way of supply to a servo motor, to eliminate a probable error of a precise feed in the subsequent dynamic state of the feed mechanism, on a basis of the estimated deformation of the elastic mechanical model.

The sampled data may preferably comprise a command value of the drive command on the way of supply to the servo motor, or one of a detected data and a stored data.

The estimated deformation may preferably represent an elastic deformation in a feed direction of the feed mechanism, or an elastic deformation in a distortional direction of the feed mechanism. The associated portion of the machine tool may preferably comprise an entirety or significantly associated part of a structural body of the machine tool, as well as the feed mechanism.

Yet further, to achieve the object described, a twenty-sixth aspect of the invention provides a system for controlling a servo system including a servo motor for driving a feed mechanism of a numerically controlled machine tool to provide a precise feed in accordance with a drive command supplied to the servo motor, the system comprising an elastic mechanical model of an associated portion of the machine tool including the feed mechanism, a sampler for sampling a data representative of a subsequent dynamic state of the feed mechanism, an estimator for estimating a dynamic state of the elastic mechanical model on a basis of the sampled data, and for estimating a deformation of the elastic mechanical model under the estimated dynamic state, and a controller for controlling the drive command on a way of supply to the servo motor, to eliminate a probable error of the precise feed in the subsequent dynamic state of the feed mechanism, on a basis of the estimated deformation of the elastic mechanical model.

According to this aspect the invention, a system is provided for controlling a servo system including a servo motor for driving a feed mechanism of a numerically controlled machine tool to provide a precise feed in accordance with a drive command supplied to the servo motor. This system comprises an elastic mechanical model, a sampler, an estimator, and a controller. The elastic mechanical model is of an associated portion of the machine tool including the feed mechanism. The sampler samples a data representative of a subsequent dynamic state of the feed mechanism. The estimator estimates a dynamic state of the elastic mechanical model on a basis of the sampled data, and a deformation of the elastic mechanical model under the estimated dynamic state. The controller controls the drive command on a way of supply to the servo motor, for eliminating a probable error of the precise feed in the subsequent dynamic state of the feed mechanism, on a basis of the estimated deformation of the elastic mechanical model.

In this system also, the sampled data may preferably comprise a command value of the drive command on the way of supply to the servo motor, or one of a detected data and a stored data, and the estimated deformation may preferably represent an elastic deformation in a feed direction of the feed mechanism, or an elastic deformation in a distortional direction of the feed mechanism. The associated portion of the machine tool may preferably comprise an entirety or significantly associated part of a structural body of the machine tool, as well as the feed mechanism, According the first or the fourteenth aspect of the invention, in a servo control method or system for a feed drive system, a compensation is effected for an involved error of a mechanical system due to an elastic deformation in a moving direction of a moving mechanism caused by an inertial force, ensuring a processing route with a high accuracy even for a high speed feed.

According to the second or the fifteenth aspect of the invention, in a servo control method or system for a feed drive system, a compensation is effected for an error of a mechanical system due to an elastic deformation in a linear movement direction of a linear movement system caused by an inertial force, even along an acceleration or deceleration, ensuring a processing route with a high accuracy even for a high speed feed.

According to the third or the sixteenth aspect of the invention, in a servo control method or system for a feed drive system, a compensation is effected for an error of a mechanical system due to an elastic deformation of a torsional system of a feed screw mechanism caused by an inertial force, as well, ensuring a processing route with a higher accuracy even for a high speed feed.

According to the fourth or the seventeenth aspect of the invention, in a servo control method or system for a feed drive system, a compensation is effected for an error of a mechanical system due to an elastic deformation of a torsional system of a worm wheel mechanism caused by an inertial force, as well, ensuring a processing route with a higher accuracy even for a high speed feed.

According to the fifth or the eighteenth aspect of the invention, in a servo control method or system for a feed drive system a compensation is effected for an error of a mechanical system due to an elastic deformation of a torsional system of a feed screw mechanism or a worm wheel mechanism caused by an inertial force, as well, even along an acceleration or deceleration, ensuring a processing route with a higher accuracy even for a high speed feed.

According to the sixth, the seventh or the nineteenth aspect of the invention, in a servo control method or system for a feed drive system, a compensation is effected for an error of a mechanical system due to an elastic deformation in a linear movement direction of a linear movement system caused by an inertial force, ensuring a configuration with a high accuracy even for a high speed feed.

According to the eighth or the twentieth aspect of the invention, in a servo control method or system for a feed drive system a compensation is effected for an error of a mechanical system due to an elastic deformation of a torsional feed system caused by an inertial force, even along an acceleration or deceleration, ensuring a configuration with a higher accuracy even for a high speed feed.

According to the ninth or the twenty-first aspect of the invention, in a servo control method or system for a feed drive system, a compensation is effected for an error of a mechanical system due to an elastic deformation in a linear movement direction of a linear movement system caused by an inertial force, ensuring a configuration with a high accuracy even for a high speed feed, in a facilitated manner without update operations such as of a set value even when a mass of work changes.

According to the tenth or the twenty-second aspect of the invention, in a servo control method or system for a feed drive system, a compensation is effected for an error of a mechanical system due to an elastic deformation of a torsional feed system caused by an inertial force, even along an acceleration or deceleration, ensuring a configuration with a higher accuracy even for a high speed feed, in a facilitated manner without update operations such as of a set value even when a mass of work changes.

According to the eleventh, the twelfth or the twenty-third aspect of the invention, in a servo control method or system for a feed drive system, a compensation is effected for an error of a mechanical system due to an elastic deformation in a linear movement direction of a linear movement system caused by an inertial force, ensuring a configuration with a high accuracy even for a high speed feed, in a facilitated manner without update operations such as of a set value even when a mass of work changes.

According to the thirteenth or the twenty-fourth aspect of the invention, in a servo control method or system for a feed drive system, a compensation is effected for an error of a mechanical system due to an elastic deformation in a linear movement direction of a linear movement system caused by an inertial force, as well as for that incurring from an elastic deformation of an associated structure, ensuring a configuration with a high accuracy even for a high speed feed, in a facilitated manner without update operations such as of a set value even when a mass of work changes.

According to the twenty-fifth or the twenty-sixth aspect of the invention, a method of or system for controlling a servo system including a servo motor for driving a feed mechanism of an NC machine tool effectively eliminates a probable error of a precise feed due to an elastic deformation in a subsequent dynamic state of an associated portion of the machine tool including the feed mechanism, as the deformation is estimated within a current cycle of time for a computerized control on bases of a prepared elastic mechanical model of the associated entirety and a sampled data on a current or antecedent status of the feed mechanism or of an arbitrary signal or element associated therewith.

BRIEF DESCRIPTION OF THE ACCOMPANYING DRAWINGS

The above and further objects and novel features of the present invention will more fully appear from the following detailed description when the same is read in conjunction with the accompanying drawings, in which.

Figure 9:
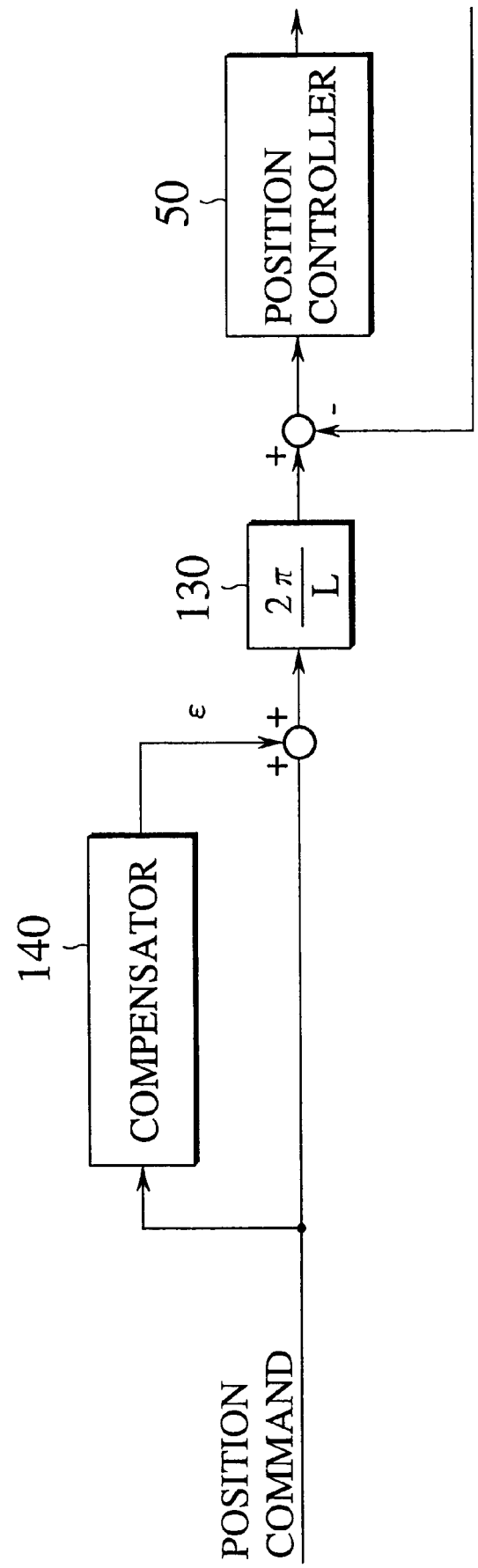
Figure 10:
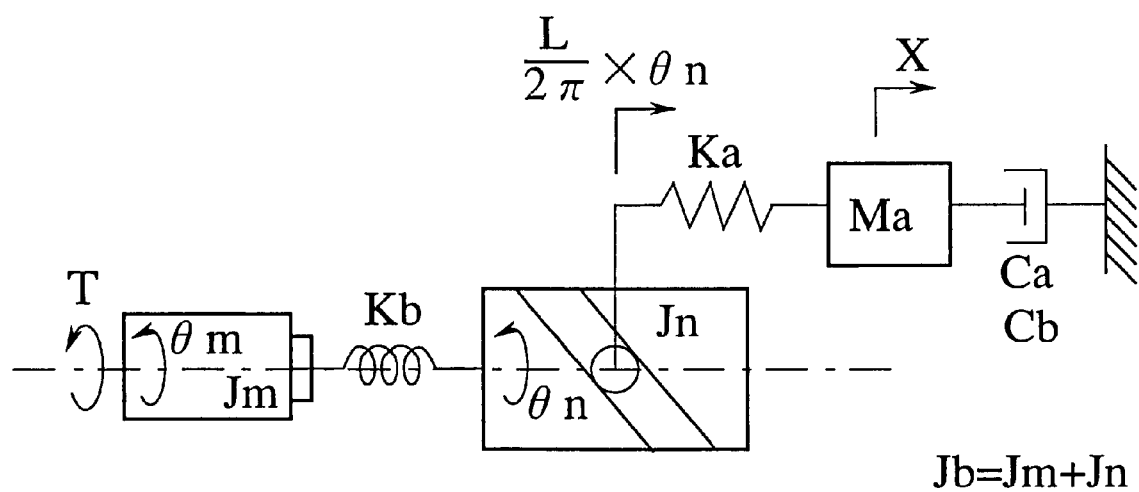

FIG. 9 s a block diagram of an essential portion of a servo control system for a feed drive system according to a fifth embodiment of the invention; and FIG. 10 illustrates an elastic mechanical model of an associated portion of a machine tool including a feed drive system, describing a principle of the invention.

DETAILED DESCRIPTION OF THE PREFERRED EMBODIMENTS

There will be detailed below the preferred embodiments of the present invention with reference to the accompanying drawings. Like members are designated by like reference characters.

Feed Drive Systems

First, there will be explained two types of feed drive systems with reference to FIGS. 1 and 2, as typical objects to be controlled by respective servo control methods and systems according to later-described embodiments of the invention.

Figure 1:
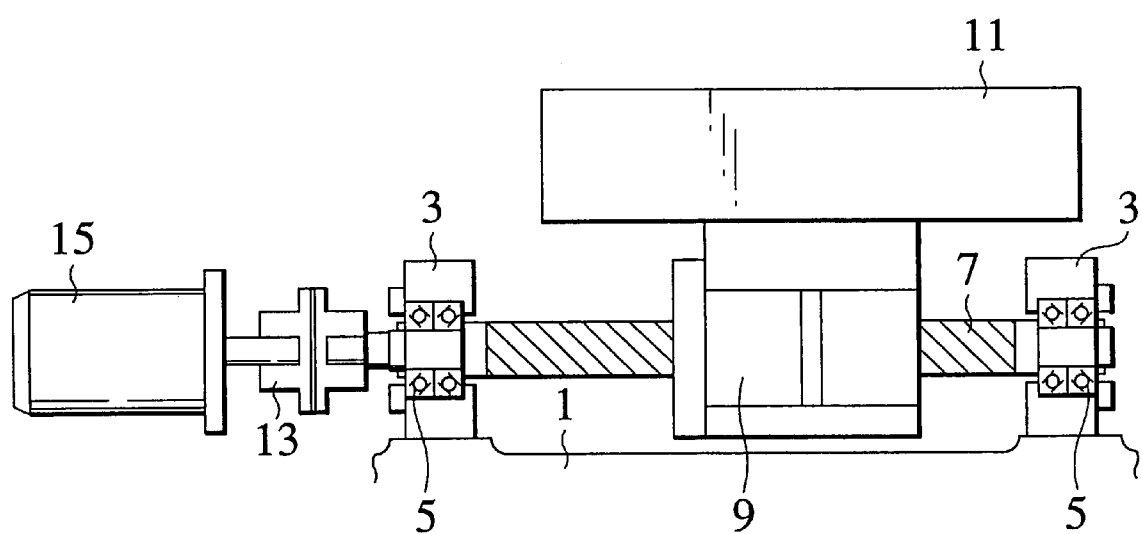
FIG. 1 is a view of a feed drive system including a linear movement mechanism with a feed screw mechanism, as a constitutional illustration for describing an embodiment of the invention.

As shown in FIG. 1, the feed drive system includes a linear movement mechanism using a feed screw mechanism, and comprises a feed screw 7 which is rotatably supported at both ends thereof by bearing members 5 to bearing brackets 3 mounted on a base member 1; a ball screw nut 9 screwed on the feed screw 7; a feeding movable body 11, such as a work table, which is securely joined to the ball screw nut 9 and is guided by a linear guide (not shown) so as to move along the left-to-right direction in the figure (as a direction of any mechanical coordinate axis); and a servo motor 15, which is coupled by a coupling 13 to one end of the feed screw 7, for driving the feed screw 7 to be rotated.

In this feed drive system, the feed screw mechanism, comprising the feed screw 7 and the ball screw nut 9, converts an angular or rotational movement of the servo motor 15 into a linear movement of the movable body 11.

Figure 2:
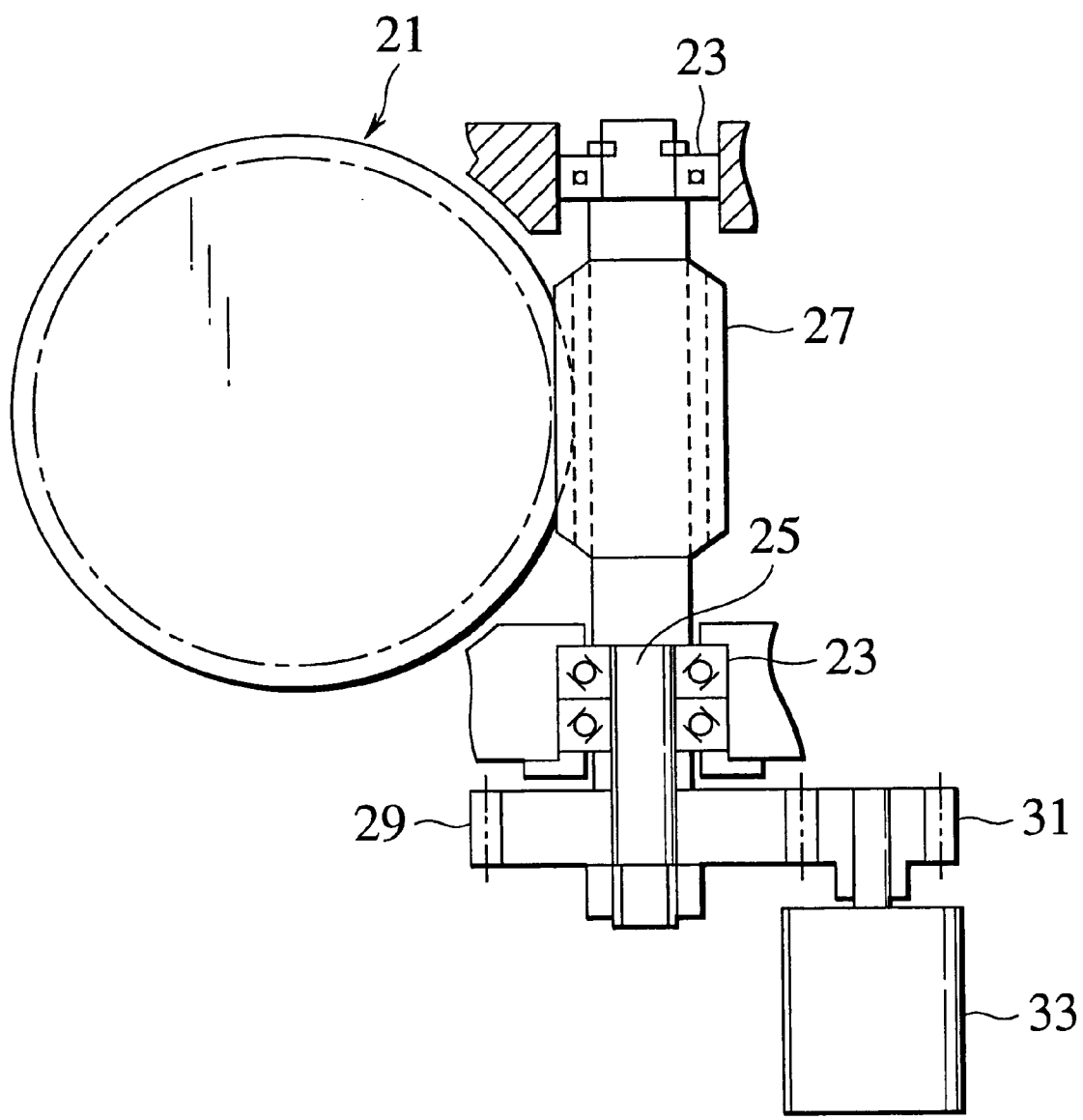
FIG. 2 is a view of a feed drive system including a rotational movement mechanism, including a worm wheel mechanism, as a constitutional illustration for describing an embodiment of the invention.

The feed drive system shown in FIG. 2 is a rotational movement mechanism using a worm wheel mechanism and comprises a worm wheel 21 provided to an outer rim of a rotating table (not shown); a worm shaft 25 rotatably supported at both ends thereof by bearing members 23; a worm 27 which is fixed on the worm shaft 25 and meshes with the worm wheel 21; and a servo motor 33 coupled by gears 29 and 31 to the worm shaft 25, for driving the shaft 25 to be thereby rotated.

In this feed drive system, the worm wheel mechanism, comprising the worm wheel 21 and the worm 27, converts a rotational movement of the servo motor 33 into a revolutional movement of the rotating table.

A feed drive system may be constituted as a rotational movement mechanism comprising a gear and a pinion meshing therewith, which mechanism will also be collectively called as a "worm wheel mechanism".

Embodiment-1

Figure 3:
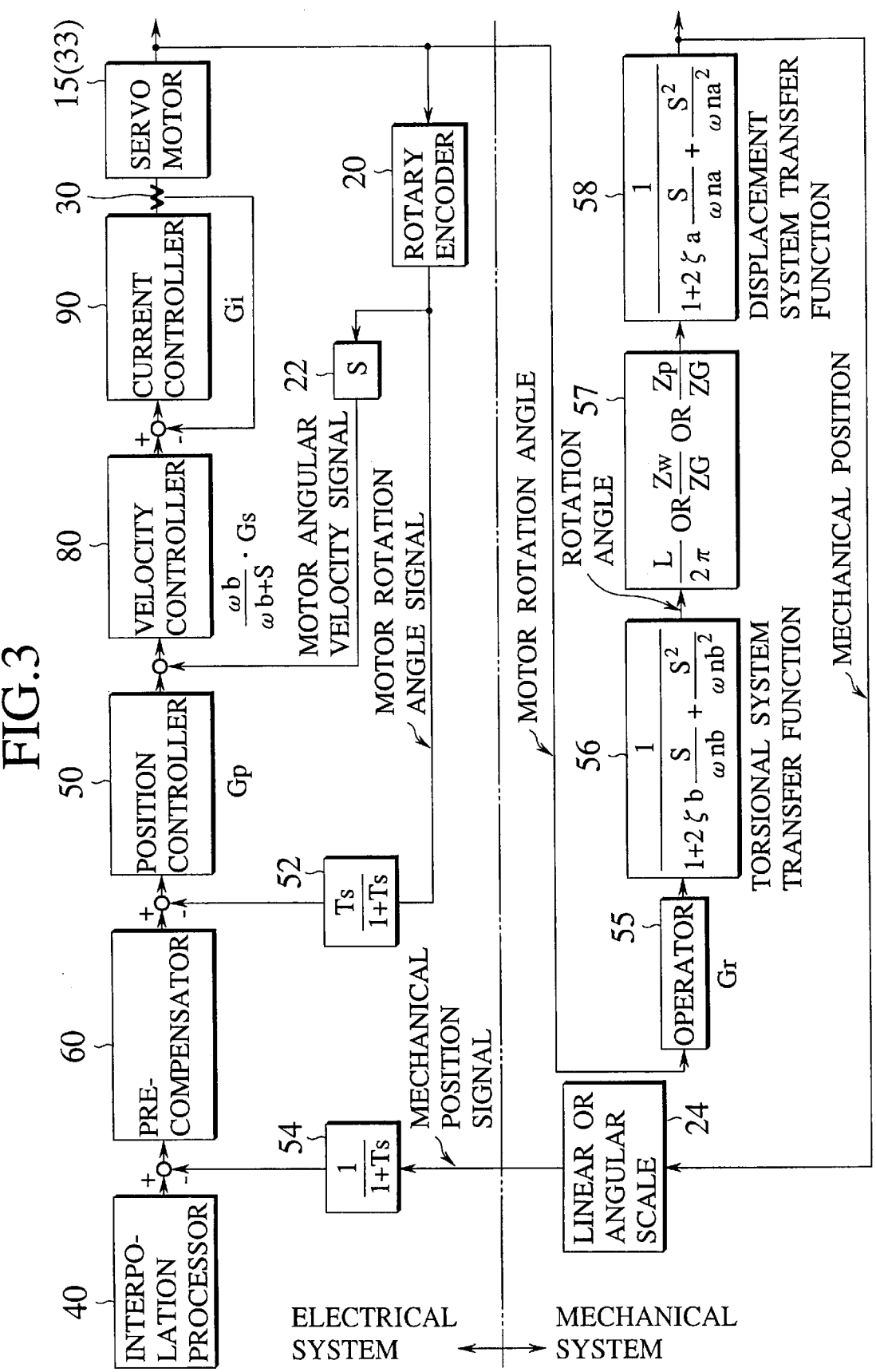
FIG. 3 is a block diagram of a servo control system for a feed drive system according to a first embodiment of the invention.

FIG. 3 shows a servo control system for a feed drive system according to a first embodiment of the invention, as a hybrid control system.

This servo control system has a position controller 50, a velocity controller 80, a current controller 90 and a rotary encoder 20 which outputs a signal of a rotation angle of the servo motor 15 or 33.

The current controller 90 receives a current signal output from a current sensor 30, as a current feedback signal thereto, and constitutes a current loop with a current loop gain Gi.

The velocity controller 80 receives, as a velocity feedback signal thereto, a motor angular velocity signal obtained as a differential or differential value at a differentiator 22 which differentiates the motor rotation angle signal output from the rotary encoder 20, and constitutes a velocity loop with an incorporated low-pass filter ωb(ωb+S) and a velocity loop gain Gs.

The position controller 50 receives, as a motor angular position feedback signal thereto, the motor rotation angle signal output from the rotary encoder 20 and subjected to a low-cut filter 52 for a hybrid control use, and constitutes a position loop with a position loop gain Gp.

As the servo motor 15 or 33 rotates, its rotation drives the feed screw 7 or the worm shaft 25 to be rotated by a gear deceleration ratio Gr.

In the case the servo motor 15 is direct-coupled to the feed screw 7 as in FIG. 1, the gear deceleration ratio is a unity (Gr=1). Then, a resultant rotation is converted by a torsional system transfer function into a rotation angle of the feed screw 7.

The rotation angle of the feed screw 7 is input to the linear movement system through a factor L/2π, where L is a feed screw lead.

In the case of a worm wheel mechanism, the rotation angle of the worm shaft 25 is input to a revolutional movement system through a factor ZW/ZG, where ZG is a number of teeth on the worm wheel, and ZW is a number threads on the worm. In use of a pinion mechanism, a rotation angle of a pinion axis is input to the revolutional movement system through a factor ZP/ZG, where ZG is a number of gear teeth, and ZP is a number of pinion teeth.

The linear or revolutional movement system has a mechanical position depending on an associated transfer function.

Letting Jb be a rotation moment of a concerned one of the worm pinion and feed screw, Kb be a torsional rigidity for driving to rotate the concerned one (with a torsional rigidity of associated coupling inclusive), and Cb be an equivalent rotation viscosity coefficient, a subsequent expression (1) gives a number of eigenoscillations ωnb of a torsional vibration, and an expression (2) gives an associated attenuation constant ζb, such that:

$$\omega nb = \sqrt{(Kb/Jb)} \qquad (1),$$

and $$\zeta b = Cb \cdot \omega nb/2 \qquad (2).$$

Letting Ka be a rigidity of the movement mechanism (a rigidity in a linear direction in the case of a linear movement, a torsional rigidity in the case of a revolution movement), Ma be a mass of the linear movement mechanism, Ja be a moment of inertia of the revolutional movement mechanism, and Ca be an equivalent viscosity coefficient, a subsequent expression (3) or expression (4) gives a number of eigenoscillations ωna in a movement direction, and an expression (5) gives an associated attenuation constant ζa, such that:

$$\omega na = \sqrt{(Ka/Ma)} \qquad (3)$$

or $$\omega na = \sqrt{(Ka/Ja)} \qquad (4)$$

and $$\zeta a = Ca \cdot \omega na/2 \qquad (5).$$

The transfer function of an associated torsional system is represented by a subsequent expression (6), and that of an associated movement system, by an expression (7), such that:

$$1/(\{1+2\zeta b(S/\omega nb)\}+(S^2/\omega nb^2)) \qquad (6),$$

and $$1/(\{1+2\zeta a(S/\omega na)\}+(S^2/\omega na^2)) \qquad (7),$$

where S is a Laplacian.

The mechanical position of the movement system is detected by a linear or angular scale 24 and is fed back to an electrical system, as a mechanical position signal.

Figure 4:
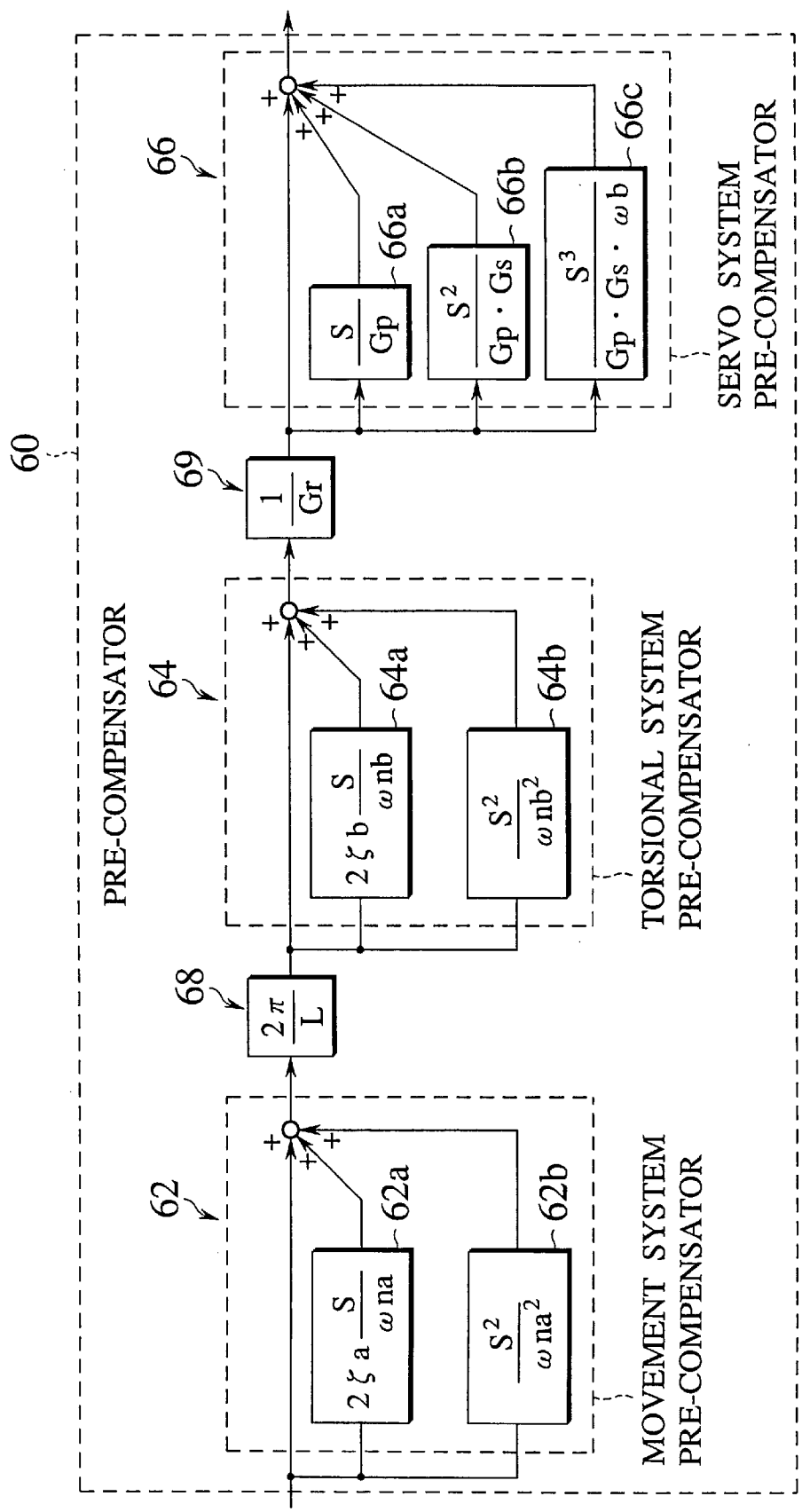
FIG. 4 is a block diagram of an essential portion of the servo control system of FIG. 3.

The electrical system includes a pre-compensator 60 which, as in FIG. 4, comprises a pre-compensator (as a first pre-compensator or pre-compensation means) 62 for the movement system, a pre-compensator (as a second pre-compensator or pre-compensation means) 64 for the torsional system, and a pre-compensator 66 for a motor servo system.

The motor servo system pre-compensator 66 has a feed-forward compensation value calculator 66a for calculating S/Gp, a feed-forward compensation value calculator 66b for calculating $S^2/(Gp \cdot Gs)$, and a feed-forward compensation value calculator 66c for calculating $S^3/(Gp \cdot Gs \cdot \omega b)$, where ωb is a corner frequency of a low-pass compensation filter in the velocity controller 80. Respective feed-forward compensation values thus calculated by the feed-forward compensation value calculators 66a–66c are added to a motor rotation angle command.

The motor servo system pre-compensator 66 effects a feed forward compensation for a control delay of the motor servo system, whereby an angular position of the servo is controlled in accordance with an input signal to the motor servo system pre-compensator 66.

The torsional system pre-compensator 64 effects a feed-forward compensation depending on the torsional system transfer function defined by the expression (6), and comprises: an interface for receiving as an input variable thereto a position control command that has been compensated in a feed-forward controlling manner at the movement system pre-compensator 62 and converted into a rotation command by an operation at a calculator 68; an attenuation compensating feed-forward calculator 64a which differentiates the input variable to provide a differentiated value as a differential value, calculates a product of the differentiated value and the torsional attenuation constant $\zeta b$ set by use of a parameter, and divides a doubled value of the product by the number of eigenoscillations $\omega nb$ set by use of a parameter to thereby determine a feed-forward compensation value; an inertial compensation feed-forward calculator 64b which is operative in parallel with the calculator 64a and which differentiates the input variable to provide a second-order differential or a second-order differential value, and divides this differentiated value by a square of the number of eigenoscillations $\omega nb$ set by use of a parameter to thereby determine another feed-forward compensation value; and an adder as a node for adding, to the input variable, the respective feed-forward compensation values calculated by the calculators 64a and 64b.

A calculator 69 calculates (1/Gr) times a result of the compensation effected at the torsional system pre-compensator 64, and a resultant value is input to the motor servo system pre-compensator 66.

The feed-forward compensation at the torsional system pre-compensator 64 effects a compensation for an error due to a torsional deformation of the torsional system, allowing for the worm and the pinion or ball screw of the torsional system to have a controlled rotation angle position in accordance with the input variable of the torsional system pre-compensator 64.

The linear or angular scale 24 (FIG. 3) provides a mechanical position signal, which is attenuated at frequencies greater than a reciprocal of a hybrid control time constant T by a high-cut filter 54 for a hybrid control system, and then subtracted from a position signal (as position control command) output from an interpolation processor 40. And, a resultant position signal is input to the pre-compensator 60, where it constitutes an input variable to the movement system pre-compensator 62 (FIG. 4).

The movement system pre-compensator 62 effects a feed-forward compensation in accordance with the movement system transfer function defined by the expression (7), and comprises: an attenuation compensating feed-forward calculator 62a which differentiates the input variable to provide a differentiated value as a differential value, calculates a product of the differentiated value and the torsional attenuation constant $\zeta a$ set by use of a parameter, and divides a doubled value of the product by the number of eigenoscillations $\omega na$ set by use of a parameter to thereby determine a feed-forward compensation value; an inertial compensation feed-forward calculator 62b which is operative in parallel with the calculator 62a and which differentiates the input variable to provide a second-order differential or a second-order differential value, and divides this differentiated value by a square of the number of eigenoscillations $\omega na$ set by use of a parameter to thereby determine another feed-forward compensation value; and an adder as a node for adding, to the input variable, the respective feed-forward compensation values calculated by the calculators 62a and 62b.

The feed-forward compensation at the movement system pre-compensator 62 effects a compensation for an error due to a deformation in a movement direction of the movement system, allowing a mechanical position to be controlled in accordance with the input variable of the movement system pre-compensator 62, i.e., the signal input to the pre-compensator 60.

The above explanation referred to a hybrid control system. However, a semi-closed control can be achieved by making the hybrid control time constant T infinite, and a full closed control can also be achieved by setting the hybrid control time constant T to a zero.

When a required control is for a feed with a higher precision, the feed-forward compensation described may preferably be effected in consideration of an elastic deformation of an associated portion of a machine tool including the feed mechanism, e.g. an entirety of a movement mechanism section including the base member 1 and/or any associated structural body or member else, and by employing a number of eigenoscillations of a vibration in a movement direction of the associated portion and an attenuation constant of thereof.

Embodiment-2

Figure 5:
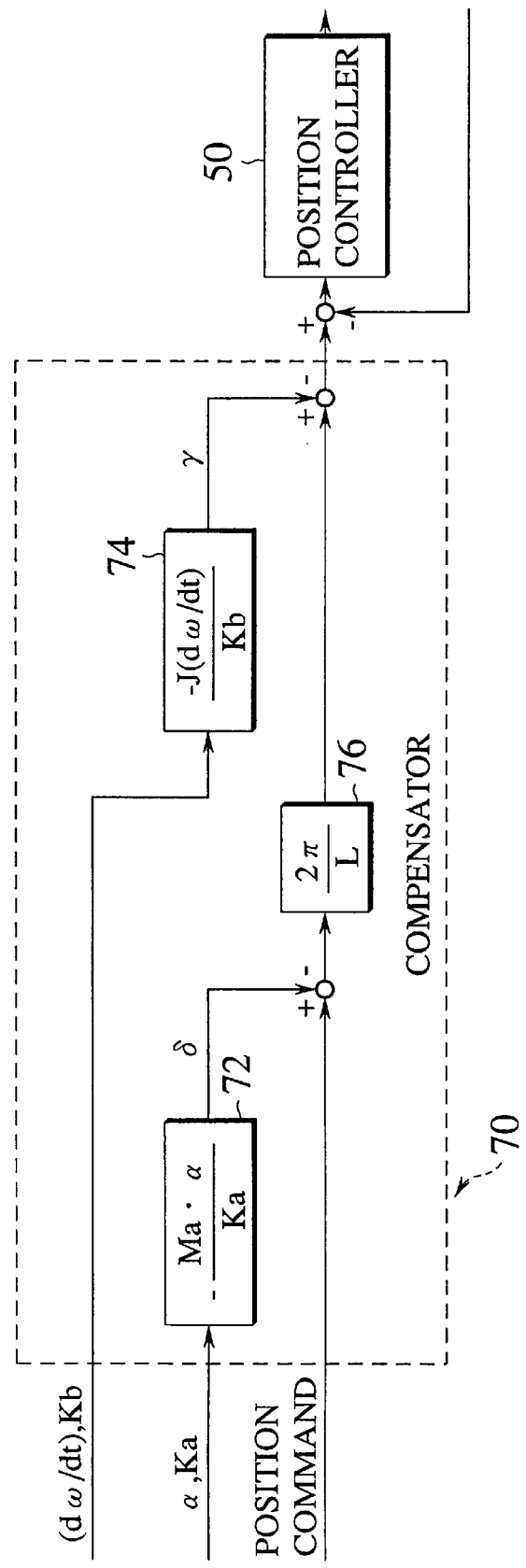
FIG. 5 is a block diagram of an essential portion of a servo control system for a feed drive system according to a second embodiment of the invention.

FIG. 5 shows an essential portion of a servo control system for a feed drive system according to a second embodiment of the invention.

The second embodiment includes a corrector 70 as a correction element or means provided at an entrance to a position loop. The corrector 70 comprises a corrector 72 (a first correction means) for a linear movement system (as a linear motion system) of the feed drive system, and a corrector 74 (a second correction means) for a torsional system of a ball screw.

The linear movement system corrector (first correction means) 72 receives a combination of values on an acceleration $\alpha$ and a rigidity Ka in a linear movement direction, as a combination of input variables thereto, calculates a correction value $\delta$ corresponding to an amount or quantity of an elastic deformation in a linear movement direction of a linear movement mechanism, depending on the input variables and a mass Ma of the linear movement mechanism set by use of a parameter, and corrects a position command value with the correction value.

The mass Ma is calculated from a magnitude of feeding torque. A set value for the mass Ma is automatically updated in accordance with a varying magnitude of the feeding torque, as a total movement mass changes with a varied mass of a work.

The acceleration $\alpha$ and the rigidity Ka in the linear movement direction are calculated on a basis of a subsequent data read via a program of an associated numerical controller or from a position command value from an interpolation processor 40 (FIG. 3).

The correction value (as an amount of elastic deformation $\delta$ in the linear movement direction) of the corrector 72 is given by an expression (8), such that:

$$\delta = Ma\alpha/Ka \tag{8}$$

In case of a linear interpolation (as a processing for a free curved surface to be a continuous connection of miniature blocks), letting F be a feed speed, Fx, Fy, . . . be feed speeds along respective axes, and $\Delta X$, $\Delta Y$, . . . be displacements or movement amounts along the axes, it so follows that $Fx = F \cdot \Delta X/P$, where $P = \sqrt{\Delta X^2 + \Delta Y^2 +} \ldots$.

Letting $\Delta Fx$ be a variation of the feed speed within a respective program block, and $\Delta t$ be a variation of time, a subsequent expression (9) gives an associated component $\alpha x$ of the acceleration, such that:

$$\alpha x = \Delta Fx/\Delta t \tag{9}$$

In case of an arcuate interpolation, letting F be a feed speed, R be an arc radius, and $\theta 0$ be an initial phase, a subsequent expression (10) gives an acceleration component $\alpha x$, such that:

$$\alpha x = (F/60)^2/R \cdot \sin\{(F/60)/R + \theta 0\} \tag{10}$$

The rigidity Ka in the linear movement direction is given as a variable depending on a position of a feed axis.

The linear movement system corrector 72 makes a correction of the position command, whereby a compensation is effected for an error of the mechanical system due to an elastic deformation in the linear movement direction of the linear movement system caused by an inertial force, permitting a high configuration accuracy even for a high speed feed.

The torsional system corrector (second correction means) 74 receives a combination of values on an angular acceleration dω/dt and a torsional rigidity Kb, as input variables thereto, calculates a correction value corresponding to a torsion angle γ of the feed screw mechanism in dependence on the input variables and a moment of inertia J (=Jb) of the linear movement mechanism set by use of a parameter, and corrects a command value of the position loop in accordance with a difference between the correction value and the command value.

The angular acceleration dω/dt and the torsional rigidity Kb are calculated on a basis of a subsequent data read via a program of the numerical controller or from the position command value from the interpolation processor 40 (FIG. 3).

The position command corrected at the corrector 74 has equivalent dimensions to the position command converted by an operation at a calculator 76 into a rotation command for the feed screw (to be identical with a motor rotation angle in the case of a direct-coupling). The calculation of the correction value γ (a torsion angle of the feed screw mechanism) at the corrector 74 is given by a subsequent expression (11), such that:

$$\gamma = -J \cdot (d\omega/dt)/Kb \qquad (11).$$

In case of a linear interpolation, letting L be a feed screw lead, and αx be an associated acceleration, a subsequent expression (12) gives an angular acceleration (dω/dt) x (in a processing for a free curved surface to be a continuous connection of miniature blocks), such that:

$$(d\omega/dt)x = 2\pi/L \cdot \alpha x \qquad (12).$$

In case of an arcute interpolation, letting F be a feed speed, R be an are radius, and θ0 be an initial phase, a subsequent expression (13) gives an associated angular acceleration (dω/dt) x, such that:

$$(d\omega/dt)x = -2\pi/L(F/60)^2/R \cdot \sin\{(F/60)/R+\theta 0\} \qquad (13).$$

The torsional rigidity Kb is given as a variable dependent on a position of a feed axis.

The corrector 74 for the feeding torsional system makes a correction of the position command, whereby a compensation is effected for an error of the mechanical system due to an elastic deformation of the feeding torsional system caused by an inertial force, as well, whether at an acceleration or deceleration or not, permitting a higher configuration accuracy coven for a high speed feed.

Embodiment-3

Figure 6:
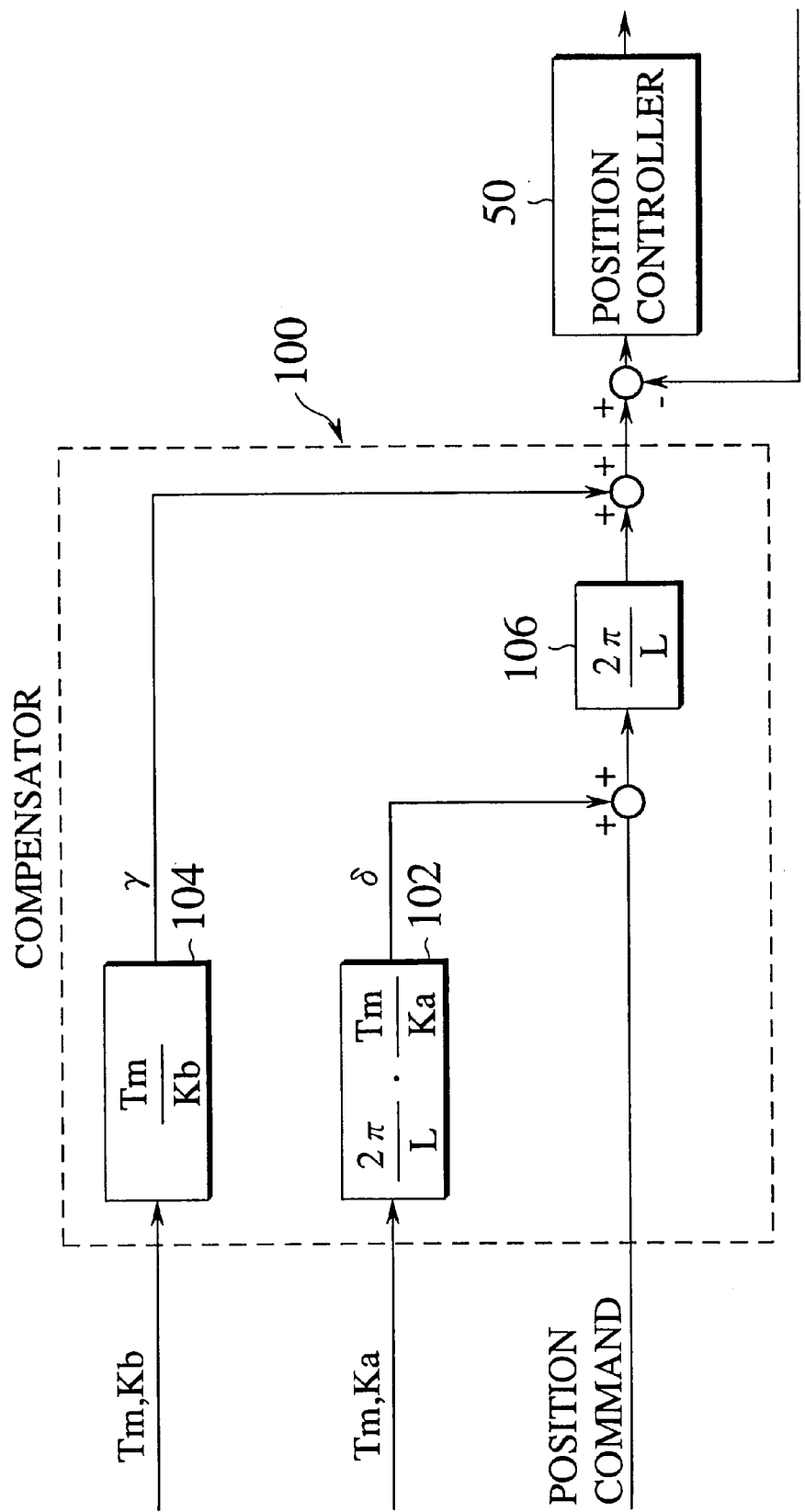
FIG. 6 is a block diagram of an essential portion of a servo control system for a feed drive system according to a third embodiment of the invention.

FIG. 6 shows an essential portion of a servo control system for a feed drive system according to a third embodiment of the invention.

The third embodiment includes a corrector 100 as a correction element or means provided at an entrance to a position loop. The corrector 100 comprises a corrector 102 for a linear movement system (as a linear motion system) of the feed drive system and a corrector 104 for a torsional system of a ball screw.

The linear movement system corrector (a first correction means) 102 receives a combination of a command value Tm of a torque command to a servo motor as a representative of an inertial force and a value on a rigidity Ka in a linear movement direction, as input variables thereto, calculates a correction value δ corresponding to an amount or quantity of an elastic deformation in the linear movement direction of a linear movement mechanism, depending on the input variables, and corrects a position command value with the correction value.

The toque command value Tm is equivalent to a magnitude of inertial torque, and may be a current command value generated at a velocity controller 80 (FIG. 3).

A subsequent expression (14) defines a relationship between the torque command value (inertial torque) Tm and an inertial force F, such that:

$$Tm = -(2\pi/L)F \qquad (14)$$
$$= -J \cdot (d\omega/dt),$$

where J is a moment of inertia, and (dω/dt) is an angular acceleration.

The corrector 102 calculates the correction value (an amount of elastic deformation δ in the linear movement direction) in accordance with an expression (15), such that:

$$\delta = (2\pi/L)(Tm/Ka) \qquad (15).$$

The linear movement system corrector 102 makes a correction of the position command value, whereby a compensation is effected for an error of the mechanical system due to an elastic deformation in the linear movement direction of the linear movement system caused by an inertial force, permitting a high configuration accuracy even for a high speed feed.

The torsional system corrector (second correction means) 104 receives a combination of the torque command value Tm for the servo motor and a torsional rigidity Kb of a feed screw mechanism, as input variables thereto, calculates a correction value corresponding to a torsion angle γ of the feed screw mechanism in dependence on the input variables, and corrects The position command value with the correction value.

The position command corrected at the corrector 104 has equivalent dimensions to the position command converted by an operation at a calculator 106 into a rotation command for the feed screw (to be identical with a motor rotation angle in the case of a direct-coupling). The calculation of the correction value γ (a torsion angle of the feed screw mechanism) at the corrector 104 is given by a subsequent expression (16), such that:

$$\gamma = Tm/Kb \qquad (16).$$

The corrector 104 for the feeding torsional system makes a correction of the position command value, whereby a compensation is effected for an error of the mechanical system due to an elastic deformation of the feeding torsional system caused by an inertial force, as well, whether at an acceleration or deceleration or not, permitting a higher configuration accuracy even for a high speed feed.

This embodiment permits an adequate correction of an inertial force without updating a set value (by use of a parameter) even when a total movement mass changes with a varied work mass.

Embodiment-4

Figure 7:
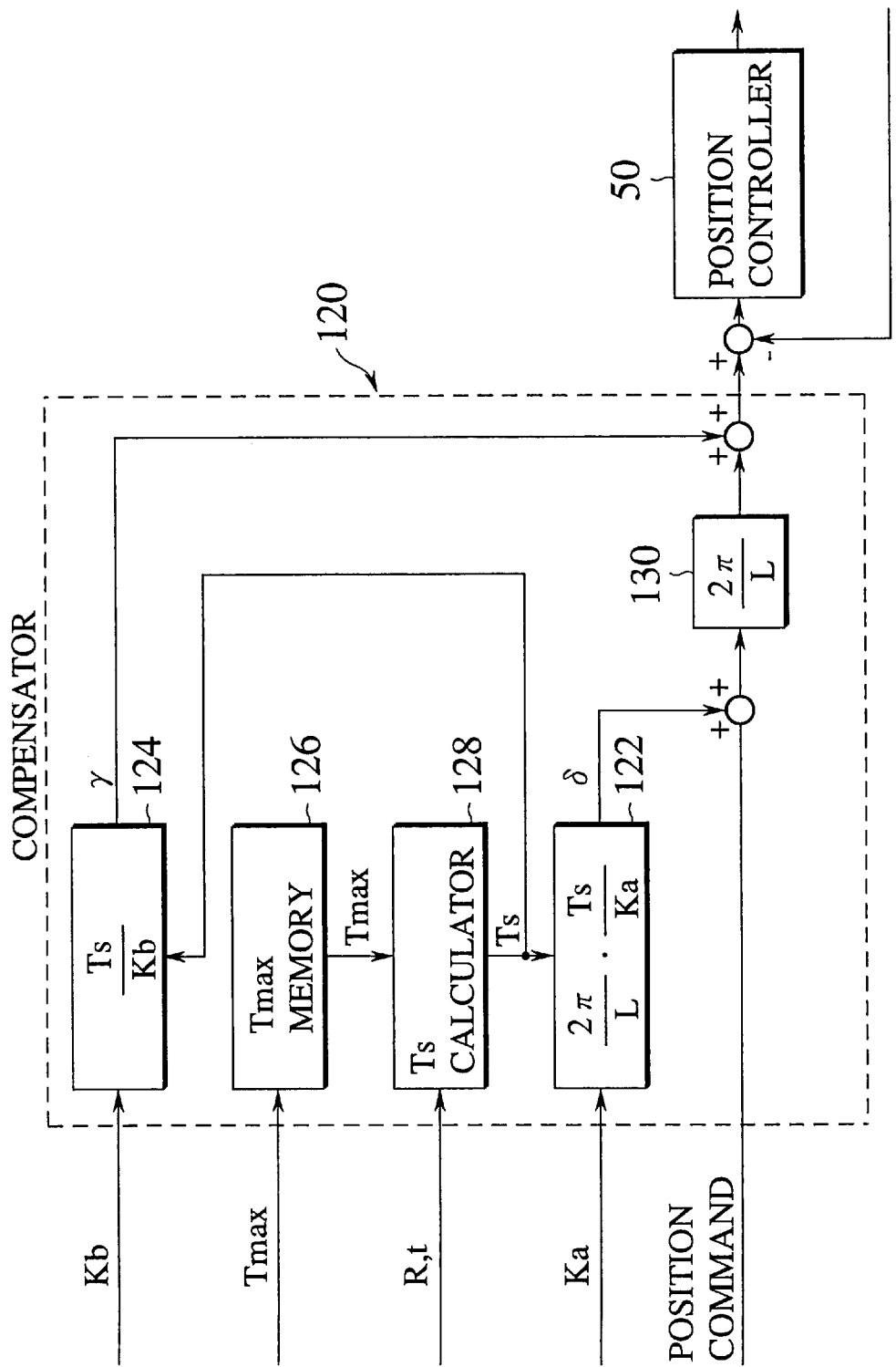
FIG. 7 is a block diagram of an essential portion of a servo control system for a feed drive system according to a fourth embodiment of the invention.

FIG. 7 shows an essential portion of a servo control system for a feed drive system according to a fourth embodiment of the invention.

The fourth embodiment includes a corrector 120 as a correction element or means provided at an entrance to a position loop. The corrector 120 is for a type of feed drive system including a linear movement mechanism having a pair of axes (X-axis and Y-axis) perpendicular to each other and cooperative to effect an arcuate interpolation in a linear movement combining manner.

The corrector 120 includes a corrector 122 for the linear movement mechanism (as a linear motion system) of the feed drive system, a corrector 124 for a torsion system of a ball screw, a measured torque storing memory 126 for storing a measured value of a magnitude of maximum inertial torque Tmax acting on or about a respective axis, and an inertial torque calculator 128 for calculating a magnitude of inertial torque Ts at a respective coordinate on a basis of the measured value of the maximum inertial torque Tmax.

Figure 8A:
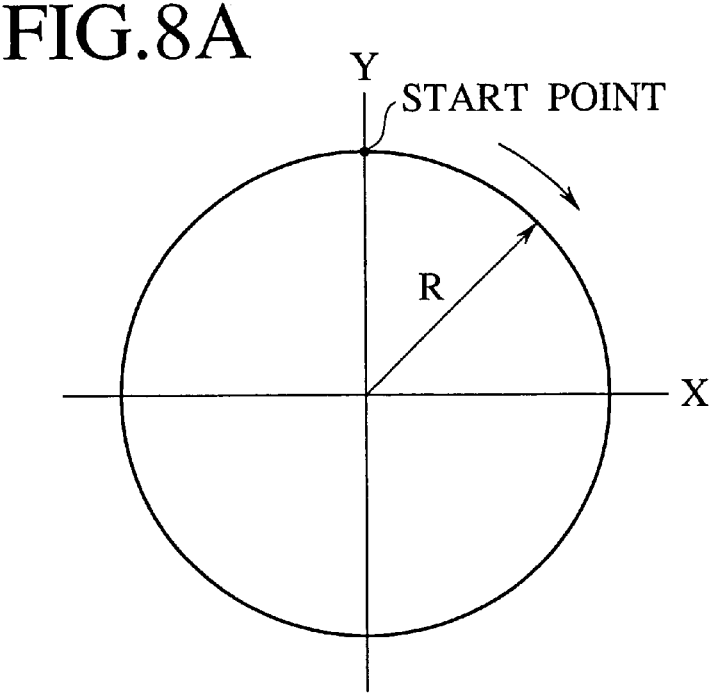
FIGS. 8A and 8B are diagrams for describing a relationship between an X-Y trace and variations of torque in the feed drive system associated with the fourth embodiment.
Figure 8B:
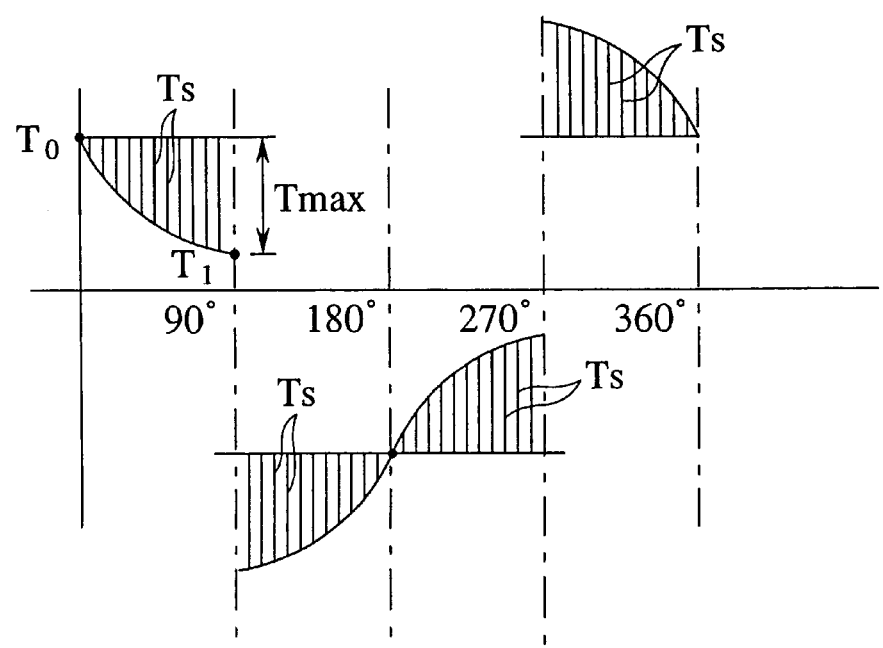

As will be seen from FIGS. 8A and 8B, the measured value of maximum inertial torque Tmax is determined for the respective axis, along with an arcuate interpolation to be executed on an X-Y plane as in FIG. 8, by detecting a magnitude of torque T0 of an own axis (e.g. X-axis) when the other axis (Y-axis in this case) has a zero speed, detecting a magnitude of torque T1 of the own axis (X-axis) when the own axis (X-axis) has a zero speed, and calculating an absolute value of a difference T0−T1 between the measured magnitudes of torque. The measured value of maximum inertial torque Tmax is obtained in advance, and stored in the measured torque storing memory 126.

The inertial torque calculator 128 employs a subsequent expression (17) for calculating a magnitude of inertial torque Ts from the measured value of maximum inertial torque Tmax, such that:

$$Ts = -Tmax \cdot \sin(F/60R)t \qquad (17),$$

where F is a feed speed, R is a radius of arcuate interpolation, and t is a lapse of time from a start point.

The linear movement system corrector 122 receives a combination of a value of the magnitude of inertial torque Ts calculated at the inertial torque calculator 128 and a value on a rigidity Ka in a linear movement direction, as input variables thereto, calculates a correction value δ corresponding to an amount or quantity of an elastic deformation in the linear movement direction of a linear movement mechanism, depending on the input variables, and corrects a position command value with the correction value.

The linear movement system corrector 122 calculates the correction value (an amount of elastic deformation δ in the linear movement direction) in accordance with an expression (18), such that:

$$\delta = (2\pi/L)(Ts/Ka) \qquad (18).$$

The linear movement system corrector 102 makes a correction of the position command value, whereby a compensation is effected for an error of the mechanical system due to an elastic deformation in the linear movement direction of the linear movement system caused by an inertial force, permitting a high configuration accuracy even for a high speed feed.

The torsional system corrector 124 receives a combination of a value of the magnitude of inertial torque Ts calculated at the inertial torque calculator 128 and a value on a torsional rigidity Kb of a feed screw mechanism, as input variables thereto, calculates a correction value corresponding to a torsion angle γ of the feed screw mechanism in dependence on the input variables, and corrects the position command value with the correction value.

The position command corrected at the corrector 124 has equivalent dimensions to the position command converted by an operation at a calculator 130 into a rotation command for the feed screw (to be identical with a motor rotation angle in the case of a direct-coupling). The calculation of the correction value γ (a torsion angle of the feed screw mechanism) at the corrector 124 is given by a subsequent expression (19), such that:

$$\gamma = Ts/Kb \qquad (19).$$

The corrector 124 for the feeding torsional system makes a correction of the position command value, whereby a compensation is effected for an error of the mechanical system due to an elastic deformation of the feeding torsional system caused by an inertial force, as well, whether at an acceleration or deceleration or not, permitting a higher configuration accuracy even for a high speed feed.

This embodiment also permits an adequate correction of an inertial force without updating a set value (by use of a parameter) even when a total movement mass changes with a varied work mass.

Embodiment 5

FIG. 9 shows an essential portion of a servo control system for a feed drive system according to a fifth embodiment of the invention.

The fifth embodiment includes a corrector 140 as a correction element or means provided at an entrance of a position loop.

The corrector 140 calculates a correction value ε depending on a difference between a position command and a calculated or measured value of a displaced position of a moving body of a linear movement mechanism including an elastic deformation due to an inertial force, and corrects a command value of the command of the position loop in accordance with the correction value ε.

In a machine tool of a mobile column system in which a column with a spindle moves horizontally on a bed (X axis movement) and the spindle moves vertically (Z axis movement), the spindle has its X-axis position affected by an elastic deformation of a the column as a structural body due to an inertial force, which elastic deformation resembles a shaking head, and the X-axis position involves an error due to the elastic deformation, which error depends on a Z-axis position and increases as the position rises.

This issue can be addressed by clarifying, from CAD data or the like, the shape, dimensions, assembly state and combination state of each part of the structural body to be analyzed, constructing a finite-element model, setting the boundary conditions and material characteristics of the structural body (such as vertical elastic coefficient, Poisson's ratio, specific gravity) and applying a load (mass by acceleration), whereby the amount of elastic deformation caused by inertial force in dependence on the Z axis position of the spindle can be determined by the finite-element method.

A modified method comprises using a high-precision measuring device, such as a laser position-measuring device or an optical scale, to measure the movement position (spindle position) of the structural body, and determining from this measurement the amount of elastic deformation caused by inertial force at the spindle position.

Since the amount of elastic deformation includes all elastic deformation caused by the inertial force of structural bodies such as the column, position correction is of the highest level of precision.

The parameters can be changed by taking several measurements of the amount of elastic deformation while changing the Z axis position of the spindle, and creating a difference curve from these measurement values, or alternatively, elastic deformation at each coordinate position on the X axis can be interpolated from the gradient of a proximate line.

A servo control method and a servo control system for a feed drive system according to the invention are particularly effective when applied to a semi-closed loop system or hybrid control system, but are also effective to a full closed loop system, in particular to a full closed loop system which suffers from a loop delay.

Elastic Mechanical Model

FIG. 10 is a diagram of a collectively depicted elastic mechanical model of an associated portion of a machine tool. Like model is pared in the respective embodiments described.

Generated torque T at a servo motor acts on the servo motor, where a rotor has a developed ration angle $\theta m[rad]$ and a rotor system has a moment of inertia $Jm[N \cdot m \cdot s^2]$, and is transmitted through a torsional rigidity $Kb[N \cdot m/rad]$ of a ball screw, which has a developed rotation angle $\theta n[rad]$ and a moment of inertia $Jn[N \cdot m \cdot s^2]$ with that of a coupling inclusive and at which it is converted into drive power to act on a movement mechanism, which has a rigidity $Ka[N/m]$ and may include a linear movement mechanism of a mass $Ma[Kg]$ and which moves subject to a viscosity coefficient $Ca, Cb$, causing a displacement $X[m]$ of a body to be driven.

The associated portion includes a feed drive mechanism. It may preferably include a support member of the feed drive mechanism, as well as a significantly associated structural body of the machine tool.

While preferred embodiments of the present invention have been described using specific terms, such description is for illustrative purposes, and it is to be understood that changes and variations may be made without departing from the spirit or scope of the following claims.

What is claimed is:

1. A servo control method for a feed drive system including a moving mechanism controlled with a position control loop, the servo control method comprising the steps of:

having a differential value of a first command value of a position command to the position control loop, as a first input variable;

calculating a first feed forward compensation value depending on the first input variable and a combination of a proper vibration frequency and an attenuation constant of a vibration in a moving direction of the moving mechanism to be set in a first parameter setting manner; and effecting a feed forward compensation for the first command value of the position command to the position control loop by the first feed forward compensation value.

2. The servo control method as claimed in claim 1, further comprising the steps of:

having a second order differential value of the first command value of the position command to the position control loop, as another input variable;

calculating another feed forward compensation value depending on the another input variable and the proper vibration frequency of the vibration in the moving direction of the moving mechanism to be set in the first parameter setting manner; and effecting a feed forward compensation for the first command value of the position command to the position control loop by the another feed forward compensation value.

3. The servo control method as claimed in claim 2, wherein the moving mechanism includes a feed screw mechanism for converting a rotational motion of a servo motor into a linear movement, and the servo control method comprises the steps of:

having a differential value of a second command value of the position command to the position control loop, as a second input variable;

calculating a second feed forward compensation value depending on the second input variable and a combination of a proper vibration frequency and an attenuation constant of a torsional vibration of the feed screw mechanism to be set in a second parameter setting manner; and effecting a feed forward compensation for the second command value of the position command to the position control loop by the second feed forward compensation value.

4. The servo control method as claimed in claim 2, wherein the moving mechanism includes a worm wheel mechanism for converting a rotational motion of a servo motor into a rotational movement, and the servo control method comprises the steps of:

having a differential value of a second command value of the position command to the position control loop, as a second input variable;

calculating a second feed forward compensation value depending on the second input variable and a combination of a proper vibration frequency and an attenuation constant of a torsional vibration of the worm wheel mechanism to be set in a second parameter setting manner; and effecting a feed forward compensation for the second command value of the position command to the position control loop by the second feed forward compensation value.

5. The servo control method as claimed in claim 1, wherein the moving mechanism includes a feed screw mechanism for converting a rotational motion of a servo motor into a linear movement, and the servo control method comprises the steps of:

having a differential value of a second command value of the position command to the position control loop, as a second input variable;

calculating a second feed forward compensation value depending on the second input variable and a combination of a proper vibration frequency and an attenuation constant of a torsional vibration of the feed screw mechanism to be set in a second parameter setting manner; and effecting a feed forward compensation for the second command value of the position command to the position control loop by the second feed forward compensation value.

6. The servo control method as claimed in claim 1, wherein the moving mechanism includes a worm wheel mechanism for converting a rotational motion of a servo motor into a rotational movement, and the servo control method comprises the steps of:

having a differential value of a second command value of the position command to the position control loop, as a second input variable;

calculating a second feed forward compensation value depending on the second input variable and a combination of a proper vibration frequency and an attenuation constant of a torsional vibration of the worm wheel mechanism to be set in a second parameter setting manner; and effecting a feed forward compensation for the second command value of the position command to the position control loop by the second feed forward compensation value.

7. The servo control method as claimed in claim 5 or 6, further comprising the steps of:

having a second order differential value of the second command value of the position command to the position control loop, as another input variable;

calculating another feed forward compensation value depending on the another input variable and the proper vibration frequency of the torsional vibration to be set in the second parameter setting manner; and effecting a feed forward compensation for the second command value of the position command to the position control loop by the another feed forward compensation value.

8. The servo control method as claimed in claim 5 or 6, further comprising the steps of:

having a second order differential value of the second command value of the position command to the position control loop, as still another input variable;

calculating still another feed forward compensation value depending on the still another input variable and the proper vibration frequency of the torsional vibration to be set in the second parameter setting manner; and effecting a feed forward compensation for the second command value of the position command to the position control loop by the still another feed forward compensation value.

9. A servo control method for a feed drive system including a linear movement mechanism, the servo control method comprising the steps of:

calculating a correction value corresponding to a quantity of an elastic deformation in a linear movement direction of the linear movement mechanism depending on a combination of an inertial force and a rigidity in the linear movement direction of the linear movement mechanism; and correcting a command value of a position command by the correction value.

10. A servo control method for a feed drive system including a linear movement mechanism, the servo control method comprising the steps of:

having an acceleration and a rigidity in a linear movement direction of the linear movement mechanism, as a combination of first input variables;

calculating a first correction value corresponding to a quantity of an elastic deformation in the linear movement direction of the linear movement mechanism depending on the combination of first input variables and a mass of the linear movement mechanism to be set in a parameter setting manner; and correcting a command value of a position command by the first correction value.

11. The servo control method as claimed in claim 10, wherein the linear movement mechanism includes a feed screw mechanism for converting a rotational motion of a servo motor into a linear movements and the servo control method comprises the steps of:

having an angular acceleration and a torsional rigidity of the linear movement mechanism, as a combination of second input variables;

calculating a second correction value corresponding to a torsion angle of the feed screw mechanism depending on the combination of second input variables and a moment of inertia of the linear movement mechanism to be set in a parameter setting manner; and correcting a command value of the position command by the second correction value.

12. A servo control method for a feed drive system including a linear movement mechanism, the servo control method comprising the steps off:

having a command value of a torque command to a servo motor and a rigidity in a linear movement direction of the linear movement mechanism as a combination of first input variables;

calculating a first correction value corresponding to a quantity of an elastic deformation in the linear movement direction of the linear movement mechanism depending on the combination of first input variables; and correcting a command value of a position command by the first correction value.

13. The servo control method as claimed in claim 12, wherein the linear movement mechanism includes a feed screw mechanism for converting a rotational motion of the servo motor into a linear movement, and the servo control method comprises the steps of:

having a command value of the torque command to the servo motor and a torsional rigidity in the linear movement direction of the linear movement mechanism, as a combination of second input variables;

calculating a second correction value corresponding to a torsion angle of the linear movement mechanism depending on the combination of second input variables; and correcting a command value of the position command by the second correction value.

14. A servo control method for a feed drive system including a linear movement mechanism having a pair of linear movement axes perpendicular to each other and controlled with a position control loop for a feed drive to be effected with an arcuate interpolation, the servo control method comprising the steps of:

measuring a magnitude of maximum inertial torque acting about either linear movement axis;

calculating a correction value corresponding to an elastic deformation in a linear movement direction of the linear movement mechanism at a respective coordinate position on a basis of the magnitude of maximum inertial torque; and correcting a command value of a position control loop by the correction value.

15. The servo control method as claimed in claim 14, wherein the measuring step comprises:

detecting a first magnitude of torque about the either axis, as the other axis has a zero speed;

detecting a second magnitude of torque about the either axis, as this axis has a zero speed; and determining a difference between the first and second magnitudes of torque to be the magnitude of maximum inertial torque.

16. A servo control method for a feed drive system including a linear movement mechanism, the servo control method comprising the steps of:

performing one of a computation and a measurement of a movement position of a moving body of the linear movement mechanism including an elastic deformation due to an inertial force;

calculating a correction value in accordance with a difference between a command value of a position command and one of a computed value and a measured value of the movement position; and correcting the command value of the position command by the correction value.

17. A servo control system for a feed drive system including a moving mechanism, the servo control system comprising:

a position control loop for a position control of the moving mechanism; and first pre-compensation means for having a differential value of a first command value of a position command to the position control loop, as a first input variable, calculating a first feed forward compensation value depending on the first input variable and a combination of a proper vibration frequency and an attenuation constant of a vibration in a moving direction of the moving mechanism to be set in a first parameter setting manner, and effecting a feed forward compensation for the first command value of the position command to the position control loop by the first feed forward compensation value.

18. The servo control system as claimed in claim 17, wherein the first pre-compensation means is adapted for having a second order differential value of the first command value of the position command to the position control loop, as another input variable, calculating another feed forward compensation value depending on the another input variable and the proper vibration frequency of the vibration in the moving direction of the moving mechanism to be set in the first parameter setting manner, and effecting a feed forward compensation for the first command value of the position command to the position control loop by the another feed forward compensation value.

19. The servo control system as claimed in claim 18, wherein the moving mechanism includes a feed screw mechanism for converting a rotational motion of a servo motor into a linear movement, and the servo control system further comprises second pre-compensation means for having a differential value of a second command value of the position command to the position control loop, as a second input variable, calculating a second feed forward compensation value depending on the second input variable and a combination of a proper vibration frequency and an attenuation constant of a torsional vibration of the feed screw mechanism to be set in a second parameter setting manner, and effecting a feed forward compensation for the second command value of the position command to the position control loop by the second feed forward compensation value.

20. The servo control system as claimed in claim 18, wherein the moving mechanism includes a worm wheel mechanism for converting a rotational motion of a servo motor into a rotational movement, and the servo control system further comprises second pre-compensation means for having a differential value of a second command value of the position command to the position control loop, as a second input variable, calculating a second feed forward compression value depending on the second input variable and a combination of a proper vibration frequency and an attenuation constant of a torsional vibration of the worm wheel mechanism to be set in a second parameter setting manner, and effecting a feed forward compensation for the second command value of the position command to the position control loop by the second feed forward compensation value.

21. The servo control system as claimed in claim 19 or 20, wherein the second pre-compensation means is adapted for having a second order differential value of the second command value of the position command to the position control loop, as still another input variable, calculating still another feed forward compensation value depending on the still another input variable and the proper vibration frequency of the torsional vibration to be set in the second parameter setting manner, and effecting a feed forward compensation for the second command value of the position command to the position control loop by the still another feed forward compensation value.

22. The servo control system as claimed in claim 17, wherein the moving mechanism includes a feed screw mechanism for converting a rotational motion of a servo motor into a linear movement, and the servo control system further comprises second pre-compensation means for having a differential value of a second columned value of the position command to the position control loop, as a second input variable, calculating a second feed forward compensation value depending on the second input variable and a combination of a proper vibration frequency and an attenuation constant of a torsional vibration of the feed screw mechanism to be set in a second parameter setting manner, and effecting a feed forward compensation for the second command value of the position command to the position control loop by the second feed forward compensation value.

23. The Servo control system as claimed in claim 17, wherein the moving mechanism includes a worm wheel mechanism for converting a rotational motion of a servo motor into a rotational movement, and the servo control system comprises second pre-compensation means for having a differential value of a second command value of the position command to the position control loop, as a second input variable, calculating a second feed forward compensation value depending on the second input variable and a combination of a proper vibration frequency and an attenuation constant of a torsional vibration of the worm wheel mechanism to be set in a second parameter setting manner, and effecting a feed forward compensation for the second command value of the position command to the position control loop by the second feed forward compensation value.

24. The servo control system as claimed in claim 22 or 23, wherein the second pre-compensation means is adapted for having a second order differential value of the second command value of the position command to the position control loop, as another input variable, calculating another feed forward compensation value depending on the another input variable and the proper vibration frequency of the torsional vibration to be set in the second parameter setting manner, and effecting a feed forward compensation for the second command value of the position command to the position control loop by the another feed forward compensation value.

25. A servo control system for a feed drive system including a linear movement mechanism, the servo control system comprising:

control means for controlling a movement position of the linear movement mechanism with a position command; and first correction means for having an acceleration and a rigidity in a linear movement direction of the linear movement mechanism, as a combination of first input variables, calculating a first correction value corresponding to a quantity of an elastic deformation in the linear movement direction of the linear movement mechanism depending on the combination of first input variables and a mass of the linear movement mechanism to be set in a parameter setting manner, and correcting a command value of the position command by the first correction value.

26. The servo control system as claimed in claim 25, wherein the linear movement mechanism includes a feed screw mechanism for converting a rotational motion of a servo motor into a linear movement, and the servo control system further comprises second correction means for having an angular acceleration and a torsional rigidity of the linear movement mechanism, as a combination of second input variables, calculating a second correction value corresponding to a torsion angle of the feed screw mechanism depending on the combination of second input variables and a moment of inertia of the linear movement mechanism to be set in a parameter setting manner, and correcting a command value of the position command by the second correction value.

27. A servo control system for a feed drive system including a linear movement mechanism, the servo control system comprising:

control means for controlling a movement position of the linear movement mechanism with a position command and a magnitude of torque of an associated servo motor with a torque command; and first correction means for having a command value of the torque command and a rigidity in a linear movement direction of the linear movement mechanism, as a combination of first input variables, calculating a first correction value corresponding to a quantity of an elastic deformation in the linear movement direction of the linear movement mechanism depending on the combination of first input variables, and correcting a command value of the position command by the first correction value.

28. The servo control system as claimed in claim 27, wherein the linear movement mechanism includes a feed screw mechanism for converting a rotational motion of the servo motor into a linear movement, and the servo control system further comprises second correction means for having the command value of the torque command and a torsional rigidity of the linear movement mechanism, as a combination of second input variables, calculating a second correction value corresponding to a torsion angle of the feed screw mechanism depending on the combination of second input variables, and correcting a command value of the position command by the second correction value.

29. A servo control system for a feed drive system including a linear movement mechanism having a pair of linear movement axes perpendicular to each other, the servo control system comprising:

control means for controlling a feed position of the linear movement mechanism with a position command covering an arcuate interpolation; and correction means for calculating a correction value corresponding to an elastic deformation in a linear movement direction of the linear movement mechanism at a respective coordinate position on a basis of a measured magnitude of maximum inertial torque acting about an associated linear movement axis, and correcting a command value of the position command by the correction value.

30. A servo control system for a feed drive system including a linear movement mechanism, the servo control system comprising:

control means for controlling a movement position of the linear movement mechanism with a position command; and correction means for calculating a correction value in accordance with a difference between a command value of the position command and one of a computed value and a measured value of a moved position of a moving body of the linear movement mechanism including an elastic deformation due to an inertial force, and correcting the command value of the position command by the correction value.

31. A method of controlling a servo system including a servo motor for driving a feed mechanism of a numerically controlled machine tool to provide a precise feed in accordance with a drive command supplied to the servo motor, the method comprising the steps of:

preparing an elastic mechanical model of an associated portion of the machine tool including the feed mechanism;

sampling a data representative of a subsequent dynamic state of the feed mechanism;

estimating a dynamic state of the elastic mechanical model on a basis of the sampled data;

estimating a deformation of the elastic mechanical model under the estimated dynamic state; and controlling the drive command on a way of supply to the servo motor, to eliminate a probable error of the precise feed in the subsequent dynamic state of the feed mechanism, on a basis of the estimated deformation of the elastic mechanical model.

32. The method as claimed in claim 31, wherein the sampled data comprises a command value of the drive command on the way of supply to the servo motor.

33. The method as claimed in claim 31, wherein the sampled data comprises one of a detected data and a stored data.

34. The method as claimed in claim 31, wherein the estimated deformation represents an elastic deformation in a feed direction of the feed mechanism.

35. The method as claimed in claim 31, wherein the estimated deformation represents an elastic deformation in a distortional direction of the feed mechanism.

36. The method as claimed in claim 31, wherein the associated portion of the machine tool comprises the feed mechanism and a structural body of the machine tool associated with the feed mechanism.

37. A system for controlling a servo system including a servo motor for driving a feed mechanism of a numerically controlled machine tool to provide a precise feed in accordance with a drive command supplied to the servo motor, the system comprising:

an elastic mechanical model of an associated portion of the machine tool including the feed mechanism;

a sampler for sampling a data representative of a subsequent dynamic state of the feed mechanism;

an estimator for estimating a dynamic state of the elastic mechanical model on a basis of the sampled data, and for estimating a deformation of the elastic mechanical model under the estimated dynamic state; and a controller for controlling the drive command on a way of supply to the servo motor, to eliminate a probable error of the precise feed in the subsequent dynamic state of the feed mechanism, on a basis of the estimated deformation of the elastic mechanical model.

38. The system as claimed in claim 37, wherein the sampled data comprises a command value of the drive command on the way of supply to the servo motor.

39. The system as claimed in claim 37, wherein the sampled data comprises one of a detected data and a stored data.

40. The system as claimed in claim 37, wherein the estimated deformation represents an elastic deformation in a feed direction of the feed mechanism.

41. The system as claimed in claim 37, wherein the estimated deformation represents an elastic deformation in a distortional direction of the feed mechanism.

42. The system as claimed in claim 37, wherein the associated portion of the machine tool comprises the feed mechanism and a structural body of the machine tool associated with the feed mechanism.

* * * * *